United States Patent
Chidester et al.

(10) Patent No.: US 11,258,104 B2
(45) Date of Patent: Feb. 22, 2022

(54) VEHICLE ENERGY-STORAGE SYSTEMS

(71) Applicant: Faraday & Future Inc., Gardena, CA (US)

(72) Inventors: Douglas D. Chidester, Gardena, CA (US); Nicholas John Sampson, Rancho Palos Verdes, CA (US)

(73) Assignee: Faraday & Future Inc., Gardena, CA (US)

( * ) Notice: Subject to any disclaimer, the term of this patent is extended or adjusted under 35 U.S.C. 154(b) by 671 days.

(21) Appl. No.: 15/192,947

(22) Filed: Jun. 24, 2016

(65) Prior Publication Data

US 2017/0005371 A1    Jan. 5, 2017

Related U.S. Application Data

(63) Continuation-in-part of application No. 15/045,517, filed on Feb. 17, 2016, now abandoned, which is a
(Continued)

(51) Int. Cl.
*H01M 10/42* (2006.01)
*H01M 2/20* (2006.01)
(Continued)

(52) U.S. Cl.
CPC ........... *H01M 10/425* (2013.01); *B60L 1/003* (2013.01); *B60L 1/02* (2013.01); *B60L 3/0038* (2013.01);
(Continued)

(58) Field of Classification Search
CPC .. B60L 15/20; B60L 1/003; B60L 1/02; B60L 2210/10; B60L 2210/30;
(Continued)

(56) References Cited

U.S. PATENT DOCUMENTS 5,879,833 A    3/1999  Yoshii et al.
8,057,928 B2  11/2011  Kohn et al.
(Continued)

FOREIGN PATENT DOCUMENTS

EP    2270918    1/2011
EP    2482362    8/2012
(Continued)

OTHER PUBLICATIONS

Written Opinion in International Application No. PCT/US2016/039884, dated Oct. 19, 2016.
Office Action in U.S. Appl. No. 14/841,617, dated Jun. 10, 2016.
Office Action in U.S. Appl. No. 14/866,907, dated Jan. 10, 2017.

*Primary Examiner* — Lingwen R Zeng
(74) *Attorney, Agent, or Firm* — Knobbe, Martens, Olson & Bear, LLP

(57) ABSTRACT

Systems and methods for storing energy for use by an electric vehicle are disclosed. Systems can include an electric vehicle battery pack including a rack configured to couple a plurality of independently removable battery strings to the vehicle, the battery strings configured to be selectively coupled in parallel to a vehicle power bus. The battery strings may include a housing, a plurality of electrochemical cells disposed within the housing, a circuit for electrically connecting the electrochemical cells, a positive high-voltage connector, a negative high-voltage connector, a switch within the housing, and a string control unit configured to control the switch. Each battery string can include a coolant inlet and a coolant outlet configured to couple with and sealingly uncouple from an external coolant supply conduit and an external coolant return conduit, and an auxiliary connector configured to couple with an external communications system and/or an external low-voltage power supply.

11 Claims, 26 Drawing Sheets

Related U.S. Application Data continuation-in-part of application No. 14/938,746, filed on Nov. 11, 2015, now Pat. No. 10,826,042, which is a continuation-in-part of application No. 14/841,617, filed on Aug. 31, 2015, now abandoned, application No. 15/192,947, filed on Jun. 24, 2016, which is a continuation-in-part of application No. 14/946,699, filed on Nov. 19, 2015, now Pat. No. 11,108,100, which is a continuation-in-part of application No. 14/841,617, filed on Aug. 31, 2015, now abandoned.

(60) Provisional application No. 62/186,977, filed on Jun. 30, 2015, provisional application No. 62/261,229, filed on Nov. 30, 2015, provisional application No. 62/249,136, filed on Oct. 31, 2015.

(51) Int. Cl.

| | | |
|---|---|---|
| *H01M 10/48* | (2006.01) | |
| *H01M 10/637* | (2014.01) | |
| *H01M 10/625* | (2014.01) | |
| *H01M 10/613* | (2014.01) | |
| *H01M 10/6568* | (2014.01) | |
| *H01M 2/10* | (2006.01) | |
| *H01M 10/658* | (2014.01) | |
| *B60L 1/00* | (2006.01) | |
| *H01M 10/6567* | (2014.01) | |
| *B60L 3/00* | (2019.01) | |
| *B60L 15/20* | (2006.01) | |
| *B60L 1/02* | (2006.01) | |
| *B60L 3/12* | (2006.01) | |
| *B60L 53/10* | (2019.01) | |
| *B60L 58/22* | (2019.01) | |
| *B60L 53/14* | (2019.01) | |
| *B60L 50/60* | (2019.01) | |
| *B60L 50/64* | (2019.01) | |
| *B60L 50/51* | (2019.01) | |
| *B60L 58/26* | (2019.01) | |
| *B60L 58/21* | (2019.01) | |
| *B60L 58/15* | (2019.01) | |
| *H01M 50/20* | (2021.01) | |
| *H01M 50/572* | (2021.01) | |
| *H01M 10/643* | (2014.01) | |

(52) U.S. Cl.
CPC .............. *B60L 3/0046* (2013.01); *B60L 3/12* (2013.01); *B60L 15/20* (2013.01); *B60L 50/51* (2019.02); *B60L 50/64* (2019.02); *B60L 50/66* (2019.02); *B60L 53/11* (2019.02); *B60L 53/14* (2019.02); *B60L 58/15* (2019.02); *B60L 58/21* (2019.02); *B60L 58/22* (2019.02); *B60L 58/26* (2019.02); *H01M 10/613* (2015.04); *H01M 10/625* (2015.04); *H01M 10/658* (2015.04); *H01M 10/6567* (2015.04); *H01M 50/20* (2021.01); *H01M 50/572* (2021.01); *B60L 2210/10* (2013.01); *B60L 2210/30* (2013.01); *B60L 2240/421* (2013.01); *B60L 2240/429* (2013.01); *B60L 2240/545* (2013.01); *B60L 2240/547* (2013.01); *B60L 2240/549* (2013.01); *B60L 2250/10* (2013.01); *H01M 10/48* (2013.01); *H01M 10/486* (2013.01); *H01M 10/643* (2015.04); *H01M 2010/4271* (2013.01); *H01M 2220/20* (2013.01); *Y02T 10/64* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01)

(58) Field of Classification Search
CPC ......... B60L 2240/421; B60L 2240/429; B60L 2240/545; B60L 2240/547; B60L 2240/549; B60L 2250/10; B60L 3/0038; B60L 3/0046; B60L 3/12; B60L 50/51; B60L 50/64; B60L 50/66; B60L 53/11; B60L 53/14; B60L 58/21; B60L 58/22; B60L 58/26; B60L 58/15; G01R 31/36; H01M 10/425; H01M 10/48; H01M 10/486; H01M 10/613; H01M 10/625; H01M 10/643; H01M 10/6567; H01M 10/658; H01M 2010/4271; H01M 2220/20; H01M 2/1077; H01M 2/34; Y02T 10/645; Y02T 10/7005; Y02T 10/7061; Y02T 10/7072; Y02T 10/7216; Y02T 10/7241; Y02T 10/7275; Y02T 90/121; Y02T 90/127; Y02T 90/128; Y02T 90/14; Y02T 90/16; Y02T 10/64; Y02T 10/642; Y02T 10/70; Y02T 10/72; Y02T 90/12

See application file for complete search history.

(56) References Cited

U.S. PATENT DOCUMENTS

| | | | |
|---|---|---|---|
| 2001/0046624 A1 | 11/2001 | Goto et al. | |
| 2008/0084180 A1* | 4/2008 | Hasegawa | H01M 2/34 320/112 |
| 2008/0138698 A1 | 6/2008 | Ogami et al. | |
| 2009/0023059 A1 | 1/2009 | Kinoshita et al. | |
| 2009/0211277 A1 | 8/2009 | Rummel et al. | |
| 2009/0220852 A1 | 9/2009 | Fujii | |
| 2009/0274952 A1 | 11/2009 | Wood et al. | |
| 2009/0297892 A1 | 12/2009 | Ijaz et al. | |
| 2010/0047682 A1 | 2/2010 | Houchin-Miller et al. | |
| 2010/0285346 A1 | 11/2010 | Graban et al. | |
| 2011/0045334 A1 | 2/2011 | Meintschel et al. | |
| 2011/0059346 A1 | 3/2011 | Jeong et al. | |
| 2011/0097617 A1 | 4/2011 | Gu et al. | |
| 2011/0135975 A1 | 6/2011 | Fuhr et al. | |
| 2012/0177970 A1* | 7/2012 | Marchio | H01M 2/0237 429/120 |
| 2012/0177971 A1* | 7/2012 | Cicero | H01M 2/1077 429/120 |
| 2012/0183930 A1 | 7/2012 | Schaefer et al. | |
| 2013/0069594 A1* | 3/2013 | Jung | H01M 10/425 320/112 |
| 2013/0157102 A1 | 6/2013 | Nagamatsu et al. | |
| 2013/0306353 A1 | 11/2013 | Zhao | |
| 2013/0344362 A1 | 12/2013 | Raisch et al. | |
| 2014/0335381 A1 | 11/2014 | Krolak | |
| 2015/0188203 A1 | 7/2015 | Enomoto et al. | |
| 2015/0194713 A1 | 7/2015 | Jin et al. | |
| 2016/0172727 A1 | 6/2016 | Chan et al. | |
| 2017/0126036 A1* | 5/2017 | Dulle | H01M 10/425 |

FOREIGN PATENT DOCUMENTS

| | | |
|---|---|---|
| EP | 2738833 | 6/2014 |
| WO | WO 2007/047317 | 4/2007 |
| WO | WO 2008/109764 | 9/2008 |
| WO | WO 2011/149868 | 12/2011 |
| WO | WO 2013/056877 | 4/2013 |
| WO | WO 2013/155700 | 10/2013 |
| WO | WO 2015/041149 | 3/2015 |

\* cited by examiner

VEHICLE ENERGY-STORAGE SYSTEMS

RELATED APPLICATIONS

This application is a continuation-in-part of U.S. patent application Ser. No. 15/045,517, filed Feb. 17, 2016, entitled "CURRENT CARRIER FOR VEHICLE ENERGY-STORAGE SYSTEMS," which is a continuation-in-part of U.S. patent application Ser. No. 14/938,746, filed Nov. 11, 2015, entitled "CURRENT CARRIER FOR VEHICLE ENERGY-STORAGE SYSTEMS," which is a continuation-in-part of U.S. patent application Ser. No. 14/841,617, filed Aug. 31, 2015, entitled "VEHICLE ENERGY-STORAGE SYSTEMS," which claims the benefit of U.S. Provisional Application No. 62/186,977, filed on Jun. 30, 2015.

This application is also a continuation-in-part of U.S. patent application Ser. No. 14/946,699, filed Nov. 19, 2015, entitled "BATTERY MODULE FOR VEHICLE ENERGY-STORAGE SYSTEMS," which is a continuation-in-part of U.S. patent application Ser. No. 14/841,617, filed Aug. 31, 2015, entitled "VEHICLE ENERGY-STORAGE SYSTEMS," which claims the benefit of U.S. Provisional Application No. 62/186,977, filed on Jun. 30, 2015. This application further claims the benefit of U.S. Provisional Application No. 62/261,229, filed Nov. 30, 2015, and U.S. Provisional Application No. 62/249,136, filed Oct. 30, 2015. The subject matter of the aforementioned applications is hereby expressly incorporated by reference in its entirety and for all purposes.

FIELD

The present application relates generally to energy-storage systems, and more specifically to energy-storage systems for vehicles.

BACKGROUND

Electric-drive vehicles may reduce the impact of fossil-fuel engines on the environment and increase the sustainability of automotive modes of transportation. Energy-storage systems are essential for electric-drive vehicles, such as hybrid electric vehicles, plug-in hybrid electric vehicles, and all-electric vehicles. Size, efficiency, and safety are important considerations for these energy-storage systems. Spatially efficient storage, improved thermal management, and balance among battery cells, promote these goals.

The current carrier and battery module disclosed herein may be directed to addressing one or more of the possible drawbacks discussed above and/or other problems of the prior art.

SUMMARY

The systems and methods of this disclosure each have several innovative aspects, no single one of which is solely responsible for its desirable attributes. Without limiting the scope as expressed by the claims that follow, its more prominent features will now be discussed briefly.

In one embodiment, an electric vehicle battery pack is described. The battery pack may include a rack configured to couple a plurality of independently removable battery strings to the vehicle, the battery strings configured to be selectively coupled in parallel to a vehicle power bus. The battery strings may include an individual battery string housing, a plurality of electrochemical cells disposed within the housing, a circuit for electrically connecting the plurality of electrochemical cells, a positive high-voltage connector located on an exterior surface of the housing, and a negative high-voltage connector located on an exterior surface of the housing. The circuit may have a positive terminal and a negative terminal, the positive high-voltage connector may be electrically coupled to the positive terminal, and the negative high-voltage connector may be electrically coupled to the negative terminal. The battery strings may further include a switch disposed within the housing and electrically connected in series with at least the positive high-voltage connector, and a string control unit disposed within the housing. The string control unit may be electrically coupled to and configured to control the switch.

Each battery string may further include a coolant inlet located on an exterior surface of the housing and configured to couple with and sealingly uncouple from an external coolant supply conduit, a coolant outlet located on an exterior surface of the housing and configured to couple with and sealingly uncouple from an external coolant return conduit, and an auxiliary connector located on an exterior surface of the housing and configured to couple with at least one of an external communications system and an external low-voltage power supply. The auxiliary connector may include a CAN bus connector configured to couple with a CAN bus. The battery pack may further include one or more thermal barriers configured to at least partially insulate adjacent battery strings. Each battery string may include a plurality of battery modules connected in series, each battery module including a plurality of electrochemical cells. Each battery string may further include a plurality of module monitoring boards, each module monitoring board communicatively coupled to one of the plurality of battery modules and configured to monitor at least one of a current, a voltage, and a temperature associated with the one battery module. The plurality of module monitoring boards may be communicatively coupled to the string control unit, and the string control unit may be configured to control the switch based at least in part on data received from one or more of the module monitoring boards. The switch may include a magnetic contactor configured to be in a disconnected position when the magnetic contactor is not energized.

In another embodiment, an electric vehicle battery pack is described. The battery pack may include a rack configured to couple a plurality of independently removable battery strings to the vehicle, the battery strings configured to be selectively coupled in parallel to a vehicle power bus. The battery strings may include an individual battery string housing, a plurality of electrochemical cells disposed within the housing, a circuit for electrically connecting the plurality of electrochemical cells, a positive high-voltage connector located on an exterior surface of the housing, and a negative high-voltage connector located on an exterior surface of the housing. The circuit may have a positive terminal and a negative terminal, the positive high-voltage connector may be electrically coupled to the positive terminal, and the negative high-voltage connector may be electrically coupled to the negative terminal. The battery pack may further include a coolant inlet located on an exterior surface of the housing and configured to couple with and sealingly uncouple from an external coolant supply conduit, a coolant outlet located on an exterior surface of the housing and configured to couple with and sealingly uncouple from an external coolant return conduit, and an auxiliary connector located on an exterior surface of the housing and configured to couple with at least one of an external communications system and an external low-voltage power supply.

Each battery string may include a switch disposed within the housing and electrically connected in series with at least the positive terminal. Each battery string may further include a string control unit disposed within the housing, the string control unit electrically coupled to and configured to control the switch. The auxiliary connector may be configured to couple with the external low-voltage power supply, and the string control unit may be configured to draw electrical power from the auxiliary connector. The auxiliary connector may include a CAN bus connector configured to connect to a CAN bus. Each battery string may include a plurality of battery modules connected in series, each battery module comprising a plurality of electrochemical cells. Each battery string may further include a plurality of module monitoring boards, each module monitoring board communicatively coupled to one of the plurality of battery modules and configured to monitor at least one of a current, a voltage, and a temperature associated with the one battery module. The battery pack may further include one or more thermal barriers configured to at least partially insulate adjacent battery strings.

In another embodiment, a method of servicing an electric vehicle is described. The method may include uncoupling a coolant supply conduit of the electric vehicle from a coolant inlet of a first battery string located within a chassis of the electric vehicle, uncoupling a coolant return conduit of the electric vehicle from a coolant outlet of the first battery string, uncoupling from an auxiliary connector of the first battery string at least one of a communications system of the electric vehicle and a low-voltage power supply of the electric vehicle, uncoupling at least one high-voltage connector of the first battery string from a power bus of the electric vehicle, and removing the first battery string from the chassis of the electric vehicle. The first battery string may include one of a plurality of independently removable battery strings of the electric vehicle.

Removing the first battery string may include moving the battery string in at least one of a horizontal direction and a vertical direction. Disengaging the at least one high-voltage connector may include removing the battery string from the electric vehicle. The method may further include placing a second battery string into the chassis of the electric vehicle, coupling at least one high-voltage connector of the second battery string to the power bus, coupling an auxiliary connector of the second battery string to at least one of the communications system and the low-voltage power supply, coupling the coolant supply conduit to a coolant inlet of the second battery string, and coupling the coolant return conduit to a coolant outlet of the second battery string.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations are merely examples and are not intended to be limiting. Throughout the drawings, similar symbols typically identify similar components, unless context dictates otherwise.

FIG. 6B is an enlarged module of the battery pack depicted in FIG. 6A.

DETAILED DESCRIPTION

The following description is directed to certain implementations for the purpose of describing the innovative aspects of this disclosure. However, a person having ordinary skill in the art will readily recognize that the teachings herein can be applied in a multitude of different ways.

FIGS. 1-20C illustrate exemplary components and systems for current carriers and battery modules. Such current carriers and battery modules may be implemented in a vehicle of any type. For example, the vehicle may be a car, truck, semi-truck, motorcycle, plane, train, moped, scooter, or other type of transportation. Furthermore, the vehicle may use many types of powertrain. For example, the vehicle may be an electric vehicle, a fuel cell vehicle, a plug-in electric vehicle, a plug-in hybrid electric vehicle, or a hybrid electric vehicle. Though described with reference to vehicle components, the exemplary current carriers and battery modules are not limited to use in vehicles. For example, the current carriers and battery modules may be used to power domestic or commercial appliances.

In some embodiments, a battery management system design implemented with multiple battery strings for an electric vehicle is disclosed. In this implementation, there is one string control unit for each battery string and multiple module monitoring boards for module voltages and temperature measurements. A single battery pack controller is used to simplify the interaction of other controllers in the vehicle with the multiple strings. Each battery string is also coupled to a current sensor and a set of contactors.

Figure 1:
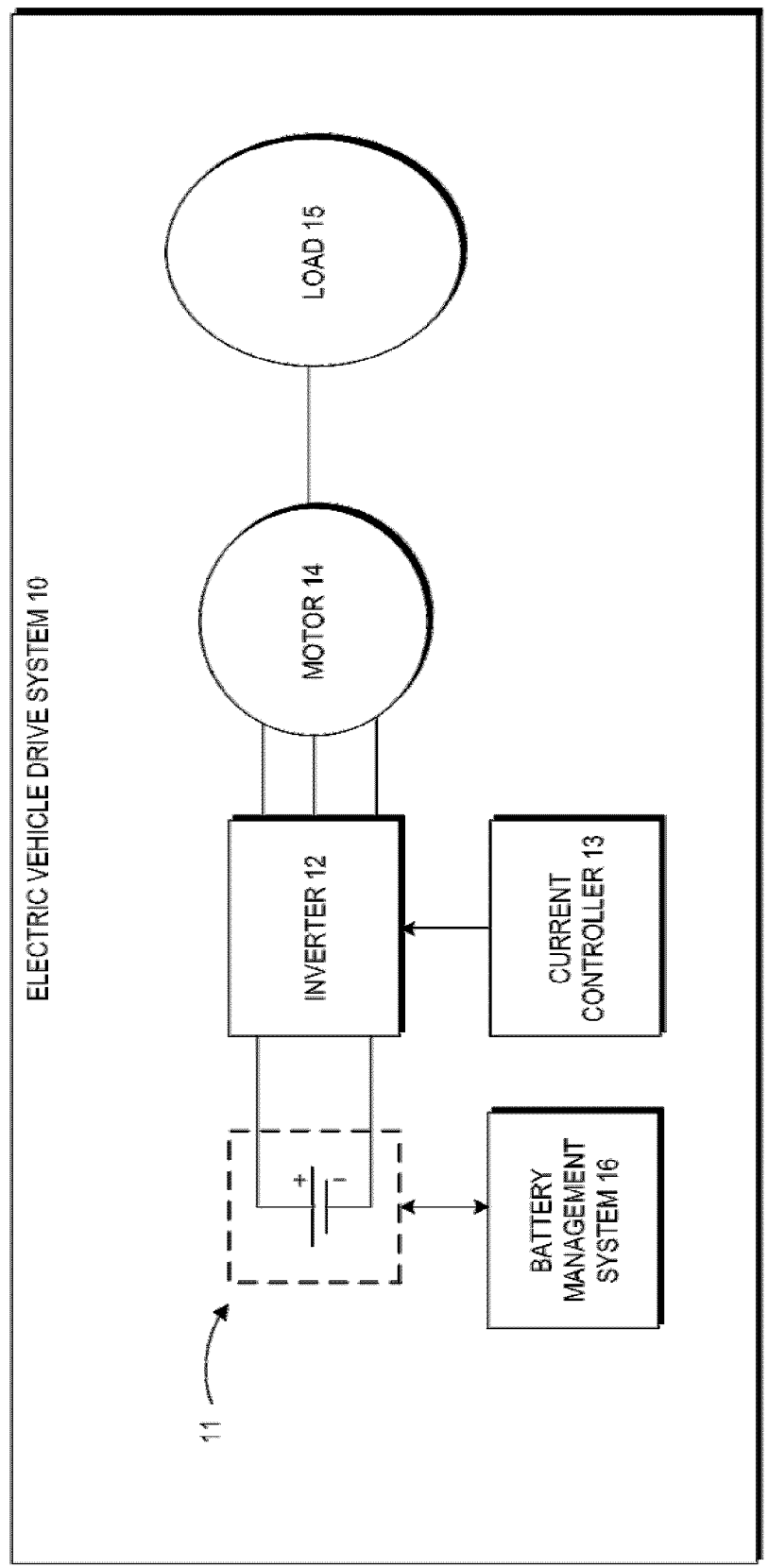
FIG. 1 is a block diagram of an exemplary electric vehicle drive system according to one embodiment.

FIG. 1 depicts a block diagram of an example electric vehicle drive system 10 including a battery management system 16 as described herein. The electric vehicle drive system 10 includes the battery or voltage source 11, an inverter 12 coupled to the battery 11, a current controller 13, a motor 14, and load 15, and the battery management system 16. The battery 11 can be a single phase direct current (DC) source. In some embodiments, the battery 11 can be a rechargeable electric vehicle battery or traction battery used to power the propulsion of an electric vehicle including the drive system 10. Although the battery 11 is illustrated as a single element in FIG. 1, the battery 11 depicted in FIG. 1 is only representational, and further details of the battery 11 are discussed below in connection with FIG. 2.

The inverter 12 includes power inputs which are connected to conductors of the battery 11 to receive, for example, DC power, single-phase electrical current, or multi-phase electrical current. Additionally, the inverter 12 includes an input which is coupled to an output of the current controller 13, described further below. The inverter 12 also includes three outputs representing three phases with currents that can be separated by 12 electrical degrees, with each phase provided on a conductor coupled to the motor 14. It should be noted that in other embodiments inverter 12 may produce greater or fewer than three phases.

The motor 14 is fed from voltage source inverter 12 controlled by the current controller 13. The inputs of the motor 14 are coupled to respective windings distributed about a stator. The motor 14 can be coupled to a mechanical output, for example a mechanical coupling between the motor 14 and mechanical load 15. Mechanical load 15 may represent one or more wheels of the electric vehicle.

Controller 13 can be used to generate gate signals for the inverter 12. Accordingly, control of vehicle speed is performed by regulating the voltage or the flow of current from the inverter 12 through the stator of the motor 14. There are many control schemes that can be used in the electric vehicle drive system 10 including current control, voltage control, and direct torque control. Selection of the characteristics of inverter 12 and selection of the control technique of the controller 13 can determine efficacy of the drive system 10.

The battery management system 16 can receive data from the battery 11 and generate control signals to manage the battery 11. Further details of the battery management system 16 are discussed in connection with FIGS. 2-3 below.

Although not illustrated, the electric vehicle drive system 10 can include one or more position sensors for determining position of the rotor of the motor 14 and providing this information to the controller 13. For example, the motor 14 can include a signal output that can transmit a position of a rotor assembly of the motor 14 with respect to the stator assembly motor 14. The position sensor can be, for example, a Hall-effect sensor, potentiometer, linear variable differential transformer, optical encoder, or position resolver. In other embodiments, the saliency exhibited by the motor 14 can also allow for sensorless control applications. Although not illustrated, the electric vehicle drive system 10 can include one or more current sensors for determining phase currents of the stator windings and providing this information to the controller 13. The current sensor can be, for example, a Hall-effect current sensor, a sense resistor connected to an amplifier, or a current clamp.

It should be appreciated that while the motor 14 is depicted as an electrical machine that can receive electrical power to produce mechanical power, it can also be used such that it receives mechanical power and thereby converts that to electrical power. In such a configuration, the inverter 12 can be utilized to excite the winding using a proper control and thereafter extract electrical power from the motor 14 while the motor 14 is receiving mechanical power.

Figure 2:
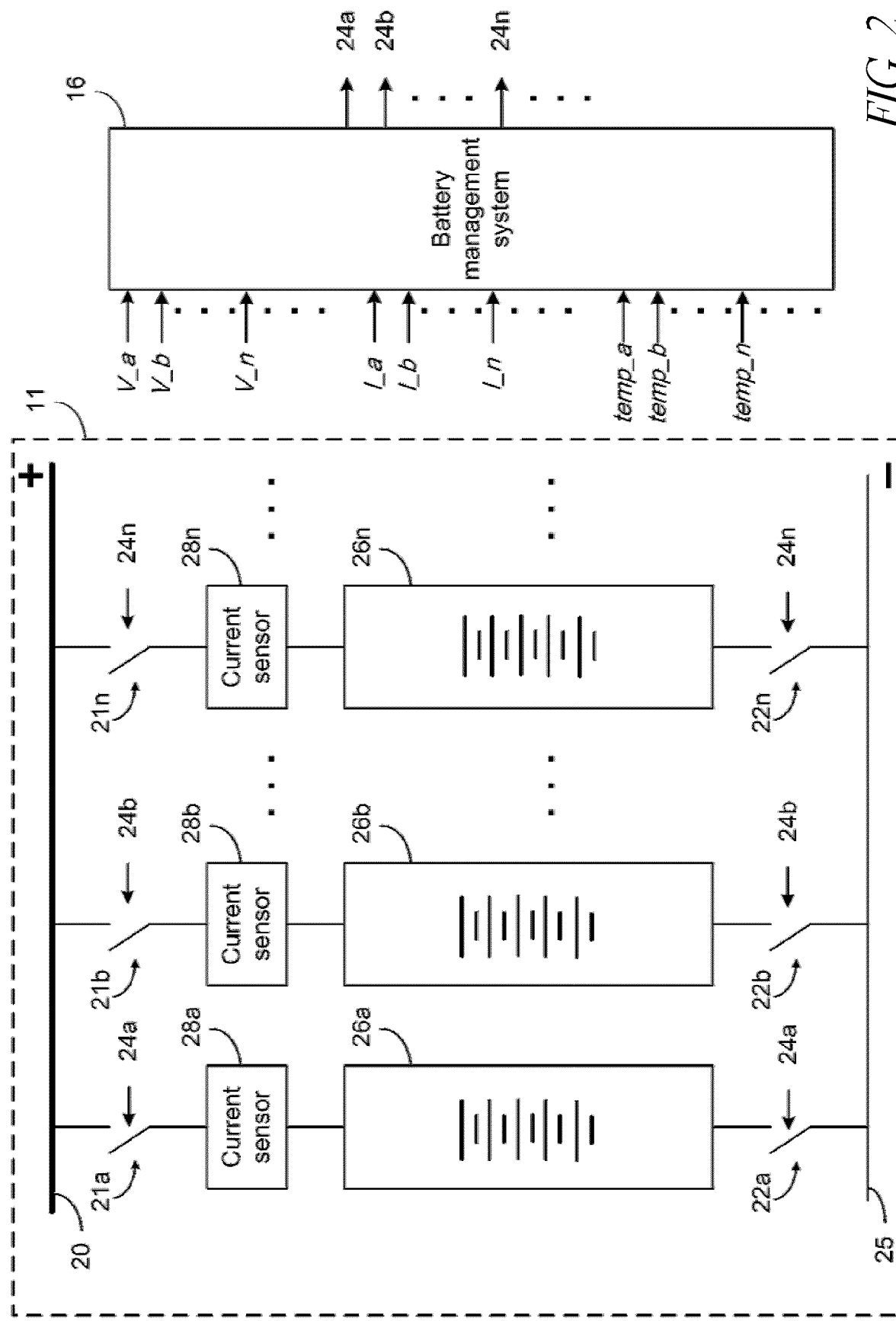
FIG. 2 is block diagram of an exemplary voltage source and battery management system according to one embodiment.

FIG. 2 is a block diagram of an example voltage source according to one embodiment. The voltage source 11 can include a plurality of battery strings 26a, 26b, . . . 26n, . . . , individually or collectively referred to herein as the battery string(s) 26, and a plurality of current sensors 28a, 28b, . . . , 28n, . . . , individually or collectively referred to herein as the current sensor(s) 28. The battery strings 26 can be individually connected to or disconnected from a positive or high power bus 20 and a negative or low power bus 25 through a plurality of switches 21a, 21b, . . . , 21n, . . . , and 22a, 22b, . . . , 22n, . . . , individually or collectively called the switches 21 and 22. The switches 21 and 22 can be controlled by control signals from a battery management system 16. The battery management system 16 can receive, among others, voltages, V_a, V_b, . . . , V_n, . . . , which are output voltages across the respective battery strings 26a, 26b, . . . , 26n, . . . , determined using, for example a plurality of sensors (not shown). The battery management system 16 can also receive currents, I_a, I_b, . . . , I_n, . . . , which are currents from the respective battery strings 26a, 26b, . . . , 26n, . . . , measured by the respective current sensors 28a, 28b, . . . , 28n, . . . . The battery management system 16 also can receive temperature measurements, temp_a, temp_b, . . . , temp_n, . . . , which are one or more of temperature measurements from the respective battery strings 26a, 26b, . . . 26n, . . . , measured by one or more temperature sensors (not shown) accompanying the battery strings. Based at least in part on the voltages, V_a, V_b, . . . , V_n, . . . , currents, I_a, I_b, . . . , I_n, . . . , and/or temperatures, temp_a, temp_b, . . . , temp_n, of the respective battery strings 26, the battery management system 16 can generate control signals 24a, 2b, . . . , 24n, . . . , individually or collectively referred to herein as the control signal(s) 24, for controlling the respective switches 21 and 22. Further details of the battery management system 16 are discussed below in connection with FIG. 3.

The battery strings 26 can include a plurality of modules, each of which in turn can include a plurality of cells. Within each battery string 26, the constituent modules and cells can be connected in series as symbolically depicted in FIG. 2. In some embodiments, the voltage source 11 can include six battery strings 26 that can be connected to or disconnected from the power buses 20, 25. The battery strings 26 can be implemented with various different types of rechargeable batteries made of various materials, such as lead acid, nickel cadmium, lithium ion, or other suitable materials. In some embodiments, each of the battery strings can output about 375V-400V if charged about 80% or more.

The current sensors 28 can be connected in series with the respective battery strings 26 between the high and low power buses 20, 25. As shown in FIG. 2 the current sensor 28 can be connected to the positive side of the respective battery strings 26 to measure the current discharged from the battery strings 26. In other embodiments, the current sensors 28 can be connected to the battery strings 26 otherwise to measure the current flow due to discharging of the battery strings 26.

The switches 21 and 22 can be contactors configured to connect the battery strings 26 to the power buses 20, 25 or disconnect the battery strings 26 from the power buses 20, 25 in response to the respective control signals 24. The switches 21 can be implemented with any suitable contactors capable of handling the level of current and voltage as needed in connection with, for example, the battery strings 26, the power buses 20, 25, and the load 15 (FIG. 1) within the electric vehicle drive system 10 (FIG. 1). In some embodiments the switches 21 and 22 can be implemented with mechanical contactors with solenoid inside. In some embodiments, the switches 21 can be powered by one or more drivers in the battery management system 16. Although in the illustrated example in FIG. 2, the switches 21 (e.g., 21n) and the switches 22 (e.g., 22n) are controlled by the same respective control signals 24 (e.g., 24n), in other embodiments, the switches 21 (e.g., 21n) can be controlled by respective positive bus connect control signals while the switches 22 (e.g., 22n) can be controlled by respective negative bus connect control signals.

The battery management system 16 can include a plurality of passive and/or active circuit elements, signal processing components, such as analog-to-digital converters (ADCs), amplifiers, buffers, drivers, regulators, or other suitable components. In some embodiments, the battery management system 16 can also include one or more processors to process incoming data to generate outputs, such as the control signals 24. In some embodiments, the battery management system 16 can also include one or more components for communicating and sending and receiving data within the battery management system 16 and/or with other components or circuitries in the electric vehicle. For example, the various components and circuits within the system 10, including components in the battery management system 16 can be in communication with one another using protocols or interfaces such as a CAN bus, SPI, or other suitable interfaces. And in some embodiments, the processing of incoming data can be at least in part performed by other components not in the battery management system 16 within the electric vehicle as the battery management system 16 communicates with other components.

Figure 3:
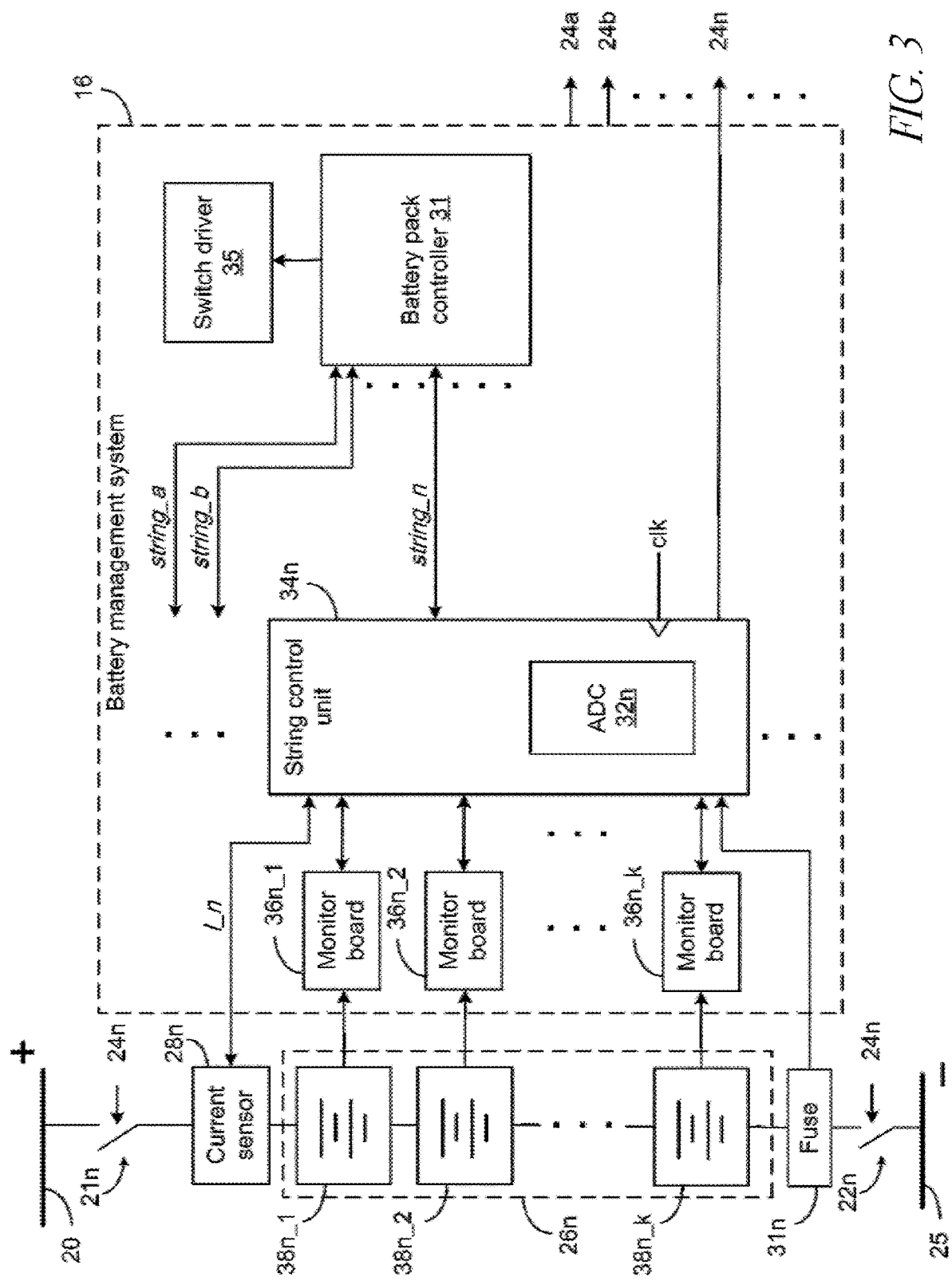
FIG. 3 is another block diagram of an exemplary voltage source and battery management system according to one embodiment.

FIG. 3 is another block diagram of example voltage source and battery management system according to one embodiment. In FIG. 3, one exemplary battery string 26n of the plurality of battery strings 26 of FIG. 2 is illustrated, and accordingly, the corresponding current sensor 28n, switches 21n, 22n, and connect control signal 24n are illustrated. Also illustrated is a fuse 31n corresponding to the battery string 26n, and although not illustrated, the battery strings 26a, 26b, . . . , 26n, . . . in FIG. 2 may each also have corresponding fuse 31a, 31b, . . . , 31n, . . . . The battery string 26n includes a plurality of battery modules 38n_1, 38n_2, . . . , 38n_k (individually or collectively referred to herein as 38n for the battery string 26n), each sending battery module telemetry data to respective module monitoring boards 36n_1, 36n_2, . . . , 36n_k (individually or collectively referred to herein as 36n for the battery string 26n) of the battery management system 16. The battery management system 16 includes a string control unit 34n for the battery string 26n in communication with the battery modules 38n_1, 38n_2, . . . , 38n_k for the battery string 26n. The battery management system 16 can include an analog-to-digital converter (ADC) 32n for processing analog data from the battery string 26n. In some embodiments, the ADC 32n can be internal to the string control unit 34n, and in other embodiments, the ADC 32n can be separate from the string control unit 34n. Although not illustrated, the battery management system 16 also may include respective string control units 34a, 34b, . . . , 34n, . . . and respective ADCs 32a, 32b, . . . , 32n, . . . for the plurality of battery strings 26a, 26b, . . . , 26n, . . . illustrated in FIG. 2. The battery management system 16 also includes a battery pack controller 31, which controls a switch driver 35 and is in communication with the plurality of string control units 34.

In the illustrated embodiment, the nth battery string 26n has k number of battery modules 38n and k number of module monitoring boards 36n. In some embodiments, one battery string 26 may include, for example 6 battery modules 38 in series. In some embodiments, one battery module 38 may include, for example, 16 battery bricks in series, and a battery brick may include 13 battery cells in parallel. Also, in some embodiments the voltage source 11 (FIG. 1) of the electric vehicle drive system 10 (FIG. 1) can include 1 battery pack, which includes, for example 6 battery strings 26. A battery cell can be, for example, a Li-ion cell, and the battery pack for the electric vehicle drive system 10 can provide power greater than, for example 500 kW.

Each of the battery modules 38 may be assembled with an interface, such as a board or plane (not shown), that is configured to gather various battery module telemetry data such as voltage, current, charge, temperature, etc. to be communicated to the module monitoring boards 36. In the illustrated embodiment, the module monitoring boards 36n_1, 36n_2, . . . , 36n_k communicate with the string control unit 34n using a communication protocol, such as isoSPI. In the illustrated embodiment, the module monitoring boards 36n can gather, for example, temperature and voltage data of the respective modules 38n and communicate them to the string control unit 34n. Also in some embodiments, analog measurement data from the battery modules 38n and the battery string 26n can be processed with the ADC 32n for further digital processes at the string control unit 34n and the battery pack controller 31, for example. In some embodiments, the module monitoring boards 36n can be individually and directly in communication with the string control unit 34n, and in other embodiments, the module monitoring boards 36n can be collectively and/or indirectly in communication with the string control unit 34n through a communication bus or in a daisy chained configuration.

The string control unit 34n can be a processor configured to monitor status of the battery modules 38n and the battery string 26n, test and monitor isolation of the battery string 26n, manage temperature of the battery modules 38n and the battery string 26n, execute battery management algorithms, and generate the control signal 24n for controlling one or both of the switches 21n and 22n of the battery string 26n. Similarly, the respective string control units 34a, 34b, . . . , 34n, . . . for the battery strings 26a, 26b, . . . , 26n, . . . illustrated in FIG. 2 can perform the same functions for the respective battery strings 26 so that the battery management system 16 as a whole outputs the control signals 24a, 24b, ..., 24n, ... from the respective string control units 34a, 34b, ..., 34n, ... to the corresponding switches 21a, 21b, ..., 21n, ..., and 22a, 22b, ..., 22n, .... In the illustrated embodiment, the string control unit 34n can also be in communication with the current sensor 28n and receive, for example, the current reading I_n of the battery string 26n. Also, the string control unit 34n can be coupled to the fuse 31n to receive, for example, an indication of a tripped circuit or a blown fuse.

The battery pack controller 31 in the illustrated embodiment can be in communication with the plurality of string control units 34a, 34b, ..., 34n, .... In some embodiments, various data from the one or more of the battery strings (e.g., string_a, string_b, ..., string_n, ...) can be communicated using CAN buses and the battery management system 16 may include a plurality of CAN bus transceivers (not shown). The battery pack controller 31 is also coupled to the switch driver 35, which can provide power to the switches 21 and 22 (e.g. contactors) of the battery strings 26, and the battery pack controller 31 can be in further communication with other devices, components, or modules of the electric vehicle. In certain instances, the battery pack controller 31 can communicate to the switch driver 35 to cut power and disconnect all the switches 21 and 22. For example, when the battery pack controller 16 may be configured to disconnect all the switches 21 and 22 when it receives a signal that indicates an air bag is deployed. Also, in certain instances, the string control unit 34n may receive high temperature data from one of the modules 38n and send a warning signal to the battery pack controller 31. In such instances, the built-in redundancy of the multi-string battery structure and the battery management system allows disconnecting the potentially troubling battery string without affirmatively determining whether disconnecting the battery string is required.

It can be advantageous to implement a battery management system for an electric vehicle as disclosed herein. With conventional thinking, the parallel system looks like it will cost n times the cost of a conventional system, where is n is the number of parallel strings. However, in most safety critical Lithium battery system, redundancy is typically needed anyway, to improve false positive or negative trips. Also, the battery pack split into multiple battery strings allows use of lower current contactors, reducing cost while increasing modularity. In traditional systems with lithium batteries, if a voltage sensor fails, most battery management systems are forced to open switches or contactors of the whole pack because of a risk of overcharge which can lead to a fire or explosion. Because of this, traditional systems include a redundant voltage measurement. The voltage measurement could be another board such as an additional module monitoring board, or a Hardware Overvoltage device on the cell level.

With a multi-string system, in case of a broken voltage sensor or current sensor or temperature sensor, one string can be independently taken out of the pack and the battery pack still delivers power with the remaining strings. With a battery management system implemented as disclosed herein, added voltage redundancy may not be necessary for reliability because the level of redundancy is already built into the multi-string management system. If a voltage sensor fails, a cautious approach may be taken, removing the string, and the vehicle will still have power for the application from the remaining strings.

By avoiding redundant temperature, voltage and current sensors in a multi-string battery pack, costs can be kept low while reliability and safety can be increased. The control unit can be programmed to be safer than traditional systems, with the ability to independently open and close contactors compared to traditional battery management systems, because other strings provide redundant backup.

The multi-string battery structure and battery management system disclosed herein can also be advantageous in providing continuous power to the electric vehicle as the distributed currents in the multi-string structure and the battery management system allow increased continuous power capability of the battery pack. In some instances continuous current draw of over 1 kA can be implemented using the disclosed system. Furthermore, because the multiple battery strings distribute the total output current over multiple branches, the disclosed battery structure and battery management system allows the system to be implemented with components such as fuses, current sensors, and contactors that are cost- and size-effective as the current in one battery string is lower than is present in a non-multi-string system, and thus the individual components in a string need not carry or measure as high a current. For example, with six separate strings each handling 300 A maximum output can produce a total maximum output of 1.8 kA. Although this multi-string system may use six sets of contactors, fuses, and current measurement devices, the total cost of six sets of these devices each suitable for 300 A operation can be lower total cost as well as higher accuracy operation than a single set suitable for 1.8 kA operation. Also, the built in redundancy, among other features, of the system disclosed herein allows high reliability as faulty strings can be disconnected and removed from operation while the remaining strings can continue to provide power to the electric vehicle. The multi-string battery structure and the battery management system also allow modularity, adaptability, and scalability depending on the size and type of the vehicle and the level of power needed for the vehicle's intended use. The battery management system disclose herein provides the benefits of having multiple battery strings while effectively and efficiently managing a great number of contactors and fuses.

Figure 4:
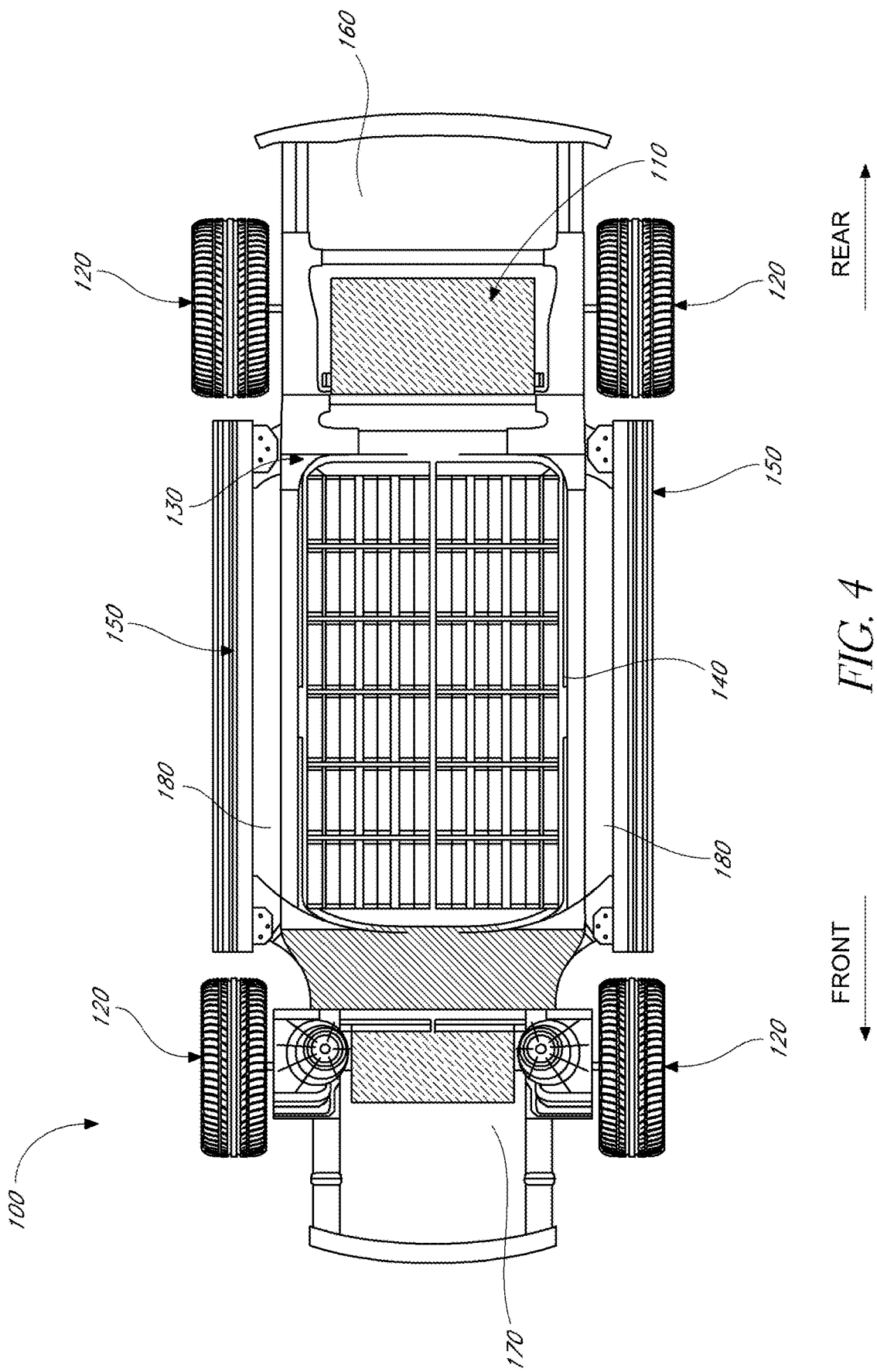
FIG. 4 is a diagrammatic illustration of an exemplary electric vehicle having an exemplary battery pack.

FIG. 4 is a diagrammatic illustration of an exemplary electric vehicle 100. Electric vehicle 100 may propelled by one or more electric motors 110. Electric motor 110 may be coupled to one or more wheels 120 through a drivetrain (not shown in FIG. 4). Electric vehicle 100 may include a frame 130 (also known as an underbody or chassis). Frame 130 may be a supporting structure of electric vehicle 100 to which other components may be attached or mounted, such as, for example, a battery pack 140.

Electric vehicle 100 may further include structural rails 150, rear crumple zone 160, front crumple zone 170, and lateral crumple zone 180. Battery pack 140 may have a compact "footprint" and be disposed such that it may be at least partially enclosed by frame 130. Battery pack 140 may be positioned at a predefined distance from structural rails 150. In some embodiments, battery pack 140 may be positioned such that frame 130, structural rails 150, rear crumple zone 160, front crumple zone 170, and lateral crumple zone 180 protect battery pack 140 from forces or impacts exerted from outside of electric vehicle 100, for example, in a collision. In some embodiments, battery pack 140 may be disposed in frame 130 to help improve directional stability (e.g., yaw acceleration). For example, battery pack 140 may be disposed in frame 130 such that a center of gravity of electric vehicle 100 may be in front of the center of the wheelbase (e.g., it may be bounded by a plurality of wheels 120).

Figure 5A:
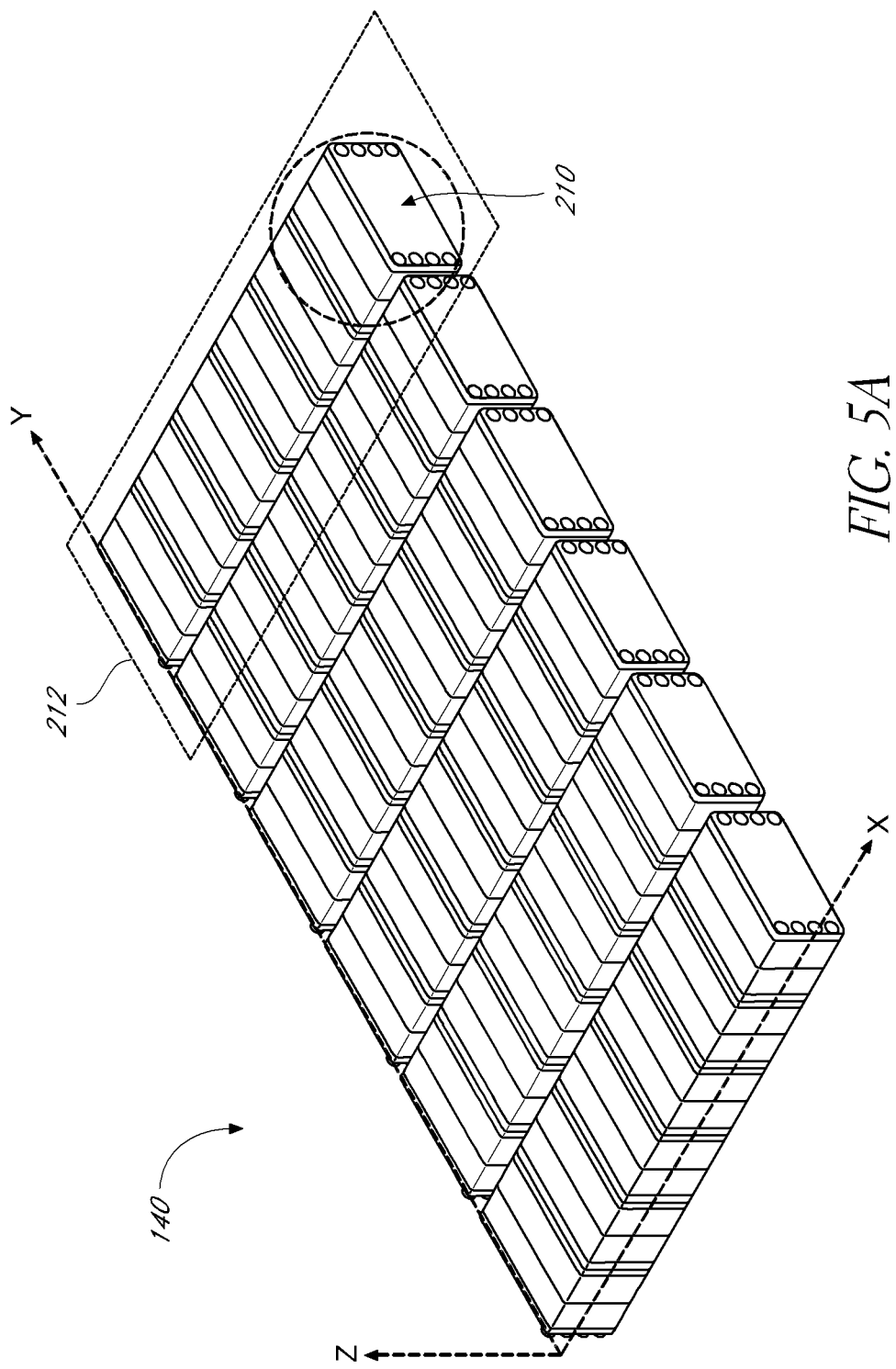
FIG. 5A is a diagrammatic illustration of the exemplary battery pack of FIG. 4 when removed from the electric vehicle.

FIG. 5A is a diagrammatic illustration of exemplary battery pack 140. Imaginary x-, y-, and z-axes are depicted on battery pack 140. Battery pack 140 may be of any size and dimensions. For example, battery pack 140 may be approximately 1000 mm wide (along x-axis), 1798 mm long (along y-axis), and 152 mm high (along z-axis).

In some embodiments, battery pack 140 may be modular and/or subdivided into smaller functional units. For example, battery pack 140 may include a plurality of battery modules 210. In one example, battery pack 140 may include thirty-six battery modules 210. At least some of battery modules 210 may be electrically connected in a series forming a string 212, and two or more strings 212 may be electrically connected in parallel. In various embodiments, modular battery configurations may be advantageous, for example, by allowing the battery pack 140 to continue operating despite the failure or malfunction of one or more strings 212, such as by disconnecting the malfunctioning strings 212. In this exemplary configuration, if one of strings 212 fails, others of strings 212 may not be affected.

Figure 5B:
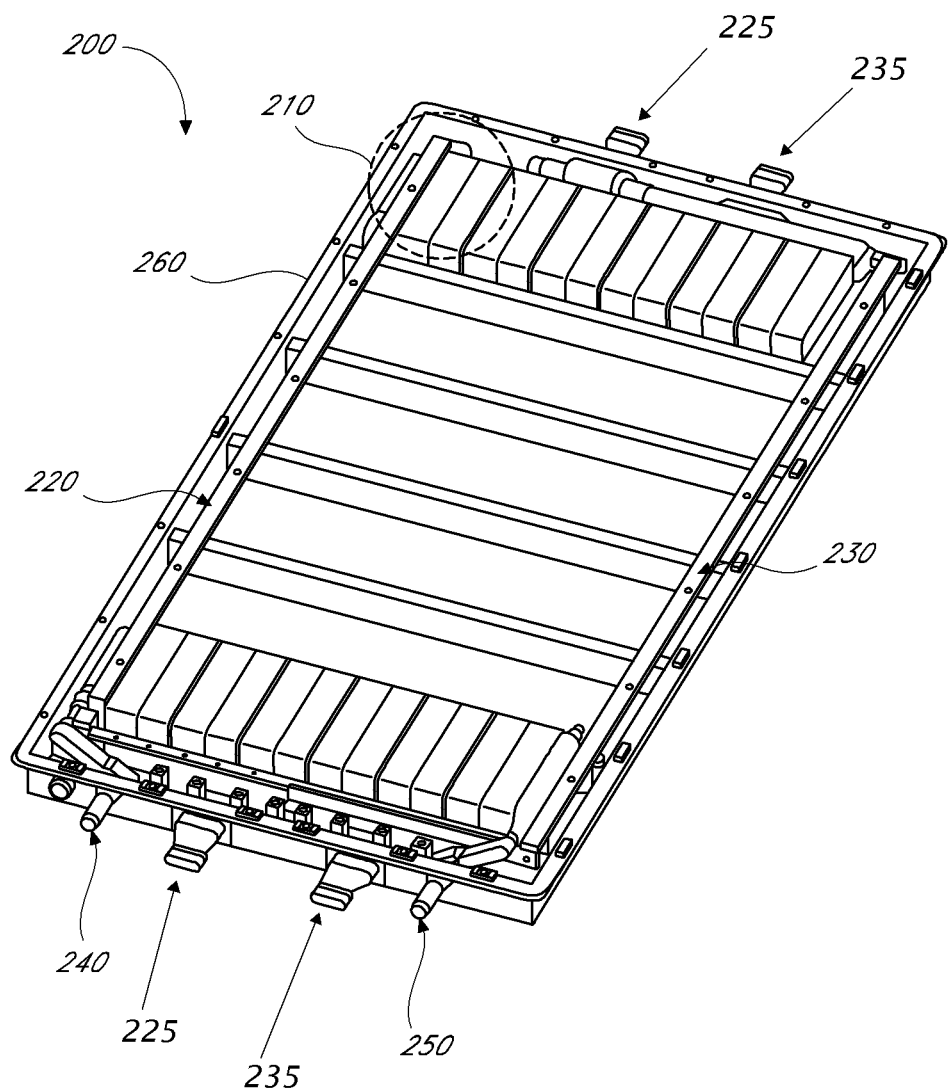
FIG. 5B is a diagrammatic illustration of the exemplary battery pack of FIG. 5A disposed in an exemplary enclosure.

FIG. 5B depicts exemplary battery pack 140 in an exemplary enclosure 200. Enclosure 200 may include a tray 260. Enclosure 200 may further include a cover (not illustrated).

Tray 260 may include a positive bus bar 220 and a negative bus bar 230. Negative bus bar 230 and positive bus bar 220 may be disposed along opposite edges of tray 260, or may be disposed to have a predefined separation between negative bus bar 230 and positive bus bar 220.

Positive bus bar 220 may be electrically coupled to a positive portion of a power connector of each battery module 210. Negative bus bar 230 may be electrically coupled to a negative portion of a power connector of each battery module 210. Positive bus bar 220 may be electrically coupled to positive terminals 225 of enclosure 200. Negative bus bar 230 may be electrically coupled to negative terminals 235 of enclosure 200. When used in electric vehicle 100, bus bars 220 and 230 may be disposed within structural rails 150.

In electric vehicle 100, battery pack 140 may supply electricity to power one or more electric motors 110, for example, through an inverter. The inverter may change direct current (DC) from battery pack 140 to alternating current (AC), as may be required for electric motors 110, according to some embodiments.

In some embodiments, battery pack 140 may be liquid cooled. Liquid cooling may be desirable for various battery pack configurations by providing efficient heat transfer in relatively compact battery configurations, so as to provide reliable temperature regulation and maintain battery cells within a desired range of operating temperatures. In liquid cooled embodiments, coolant may enter the battery pack 140 at a coolant inlet 240 and may leave at a coolant outlet 250.

Figure 6A:
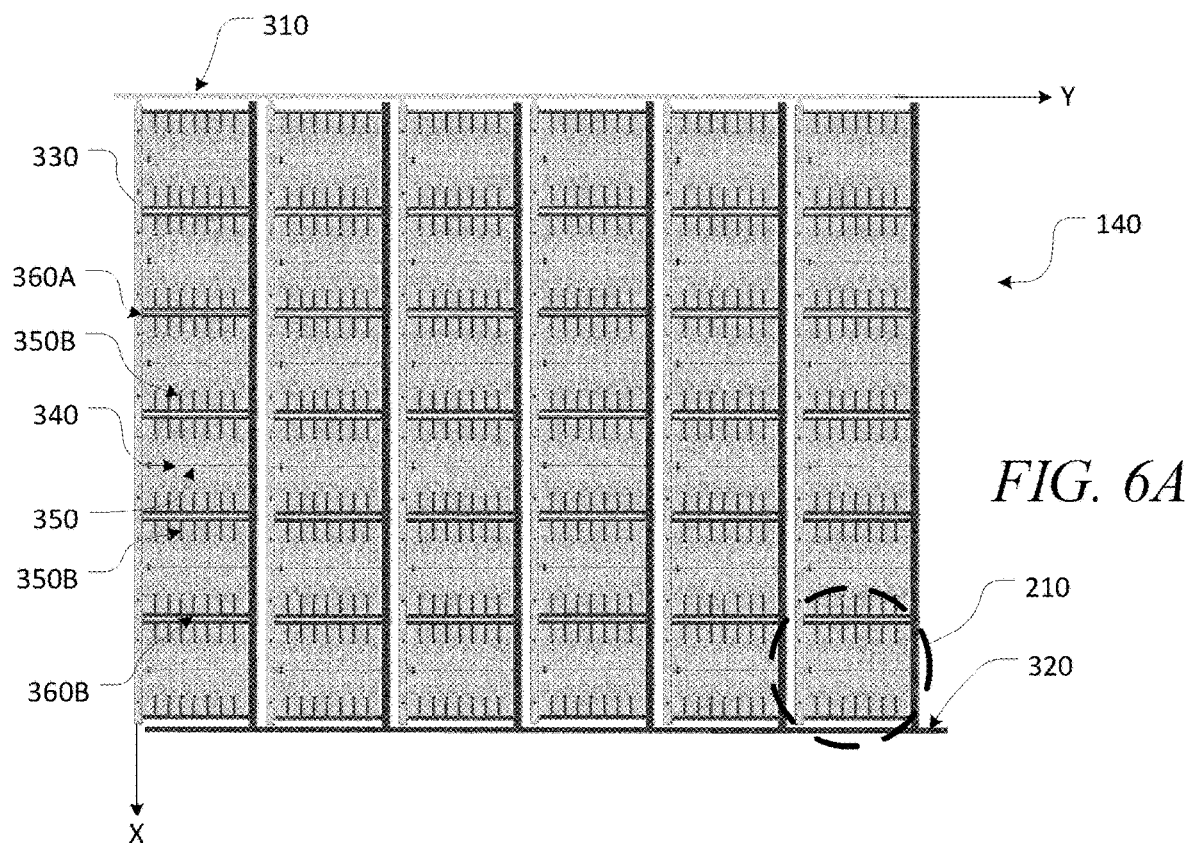
FIGS. 6A and 6B are diagrammatic illustrations of exemplary coolant flow paths in the exemplary battery pack of FIG. 5A.
Figure 6B:
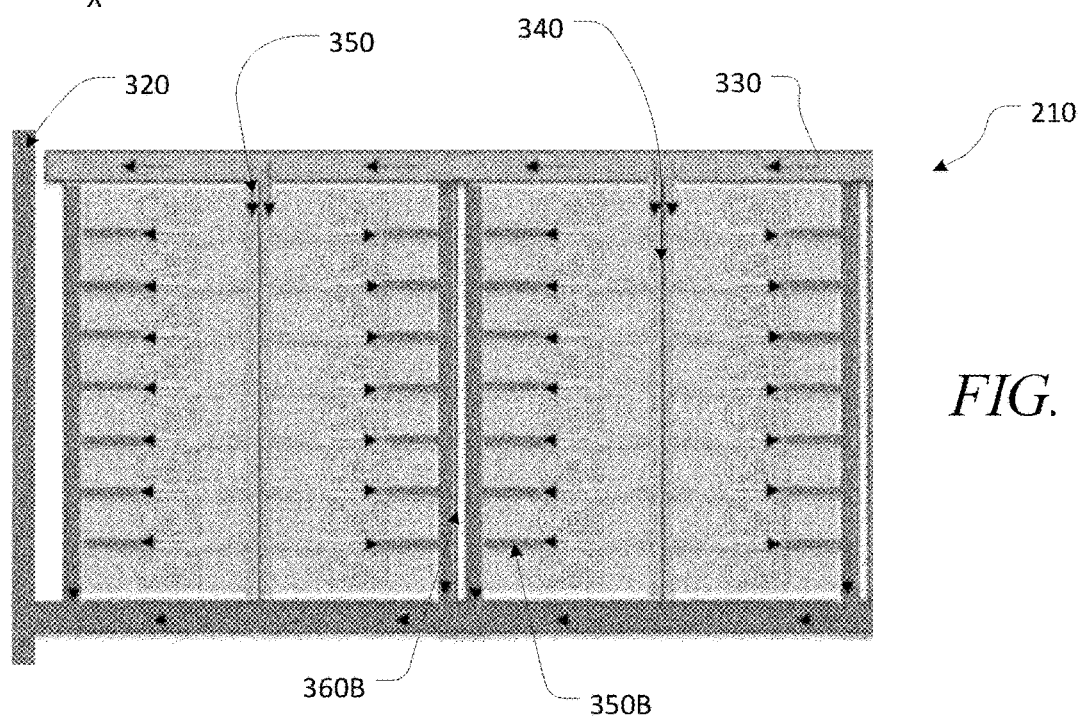

FIGS. 6A and 6B illustrate exemplary coolant flows and the exemplary operation of an exemplary coolant system and an exemplary coolant sub-system that may be used in conjunction with battery pack 140. FIG. 6B is an enlarged module 210 of the pack 140 depicted in FIG. 6A. As depicted in FIGS. 6A and 6B, an exemplary coolant system may include an ingress 310 and an egress 320. For example, coolant may be pumped into battery pack 140 at ingress 310 and pumped out of battery pack 140 at egress 320. For example, coolant may be routed in parallel to each of battery modules 210 in battery pack 140. The resulting pressure gradient within battery pack 140 may provide sufficient circulation of coolant to minimize a temperature gradient within battery pack 140 (e.g., a temperature gradient within one of battery modules 210, a temperature gradient between battery modules 210, and/or a temperature gradient between two or more of strings 212 shown in FIG. 5A).

Within battery pack 140, the coolant system may circulate the coolant, for example, to battery modules 210 (e.g., reference numeral 330 indicates the circulation). Coolant may include at least one of the following: synthetic oil, for example, poly-alpha-olefin (or poly-α-olefin, also abbreviated as PAO) oil, ethylene glycol and water, liquid dielectric cooling based on phase change, and the like.

One or more additional pumps (not shown) may be used to maintain a roughly constant pressure between multiple battery modules 210 connected in series (e.g., in string 212 in FIG. 5A) and between such strings.

The coolant sub-system may circulate coolant within battery modules 210 (e.g., the circulation indicated by reference numeral 340). In some embodiments, the coolant may enter each battery module 210 through an interface 350. The coolant may flow through battery module 210. Interface 350 may be oriented to channel coolant into battery module 210 along the y-axis. Coolant may then be driven by pressure within the coolant system to flow out of battery module 210 through one or more channels 350b oriented along the x-axis. Coolant may then be collected at the two (opposite) side surfaces 360A and 360B of the module. Side surfaces 360A and 360B may be normal to the x-axis. In some embodiments, the coolant and sub-coolant systems may be used to maintain a substantially uniform and/or constant temperature within battery pack 140.

Figure 7A:
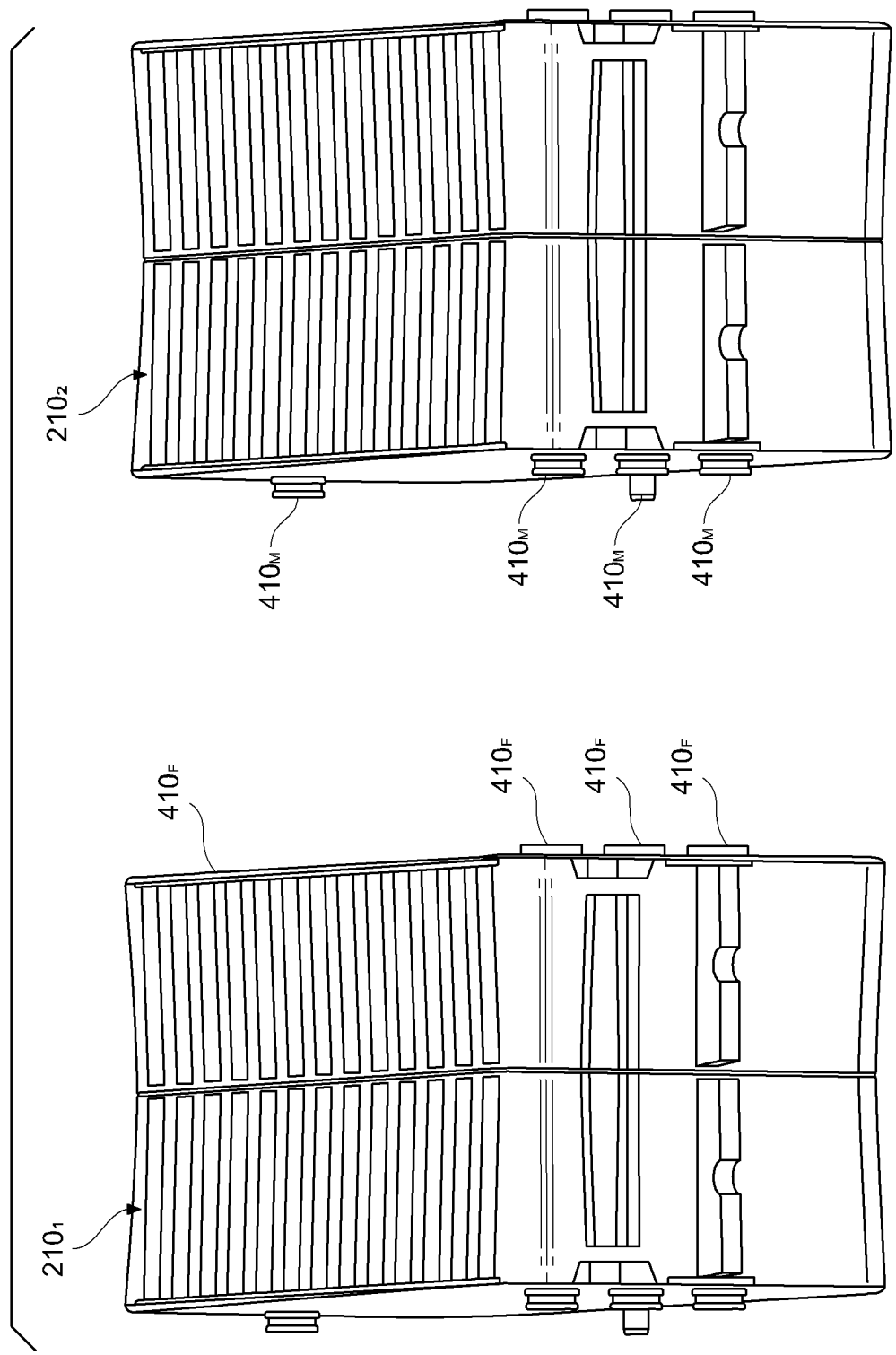
FIGS. 7A and 7B are diagrammatic illustrations of an exemplary coupling arrangement between two exemplary battery modules shown apart in FIG. 7A and coupled together in FIG. 7B. A plurality of modules may be joined together as shown, for example, in FIG. 5A.
Figure 7B:
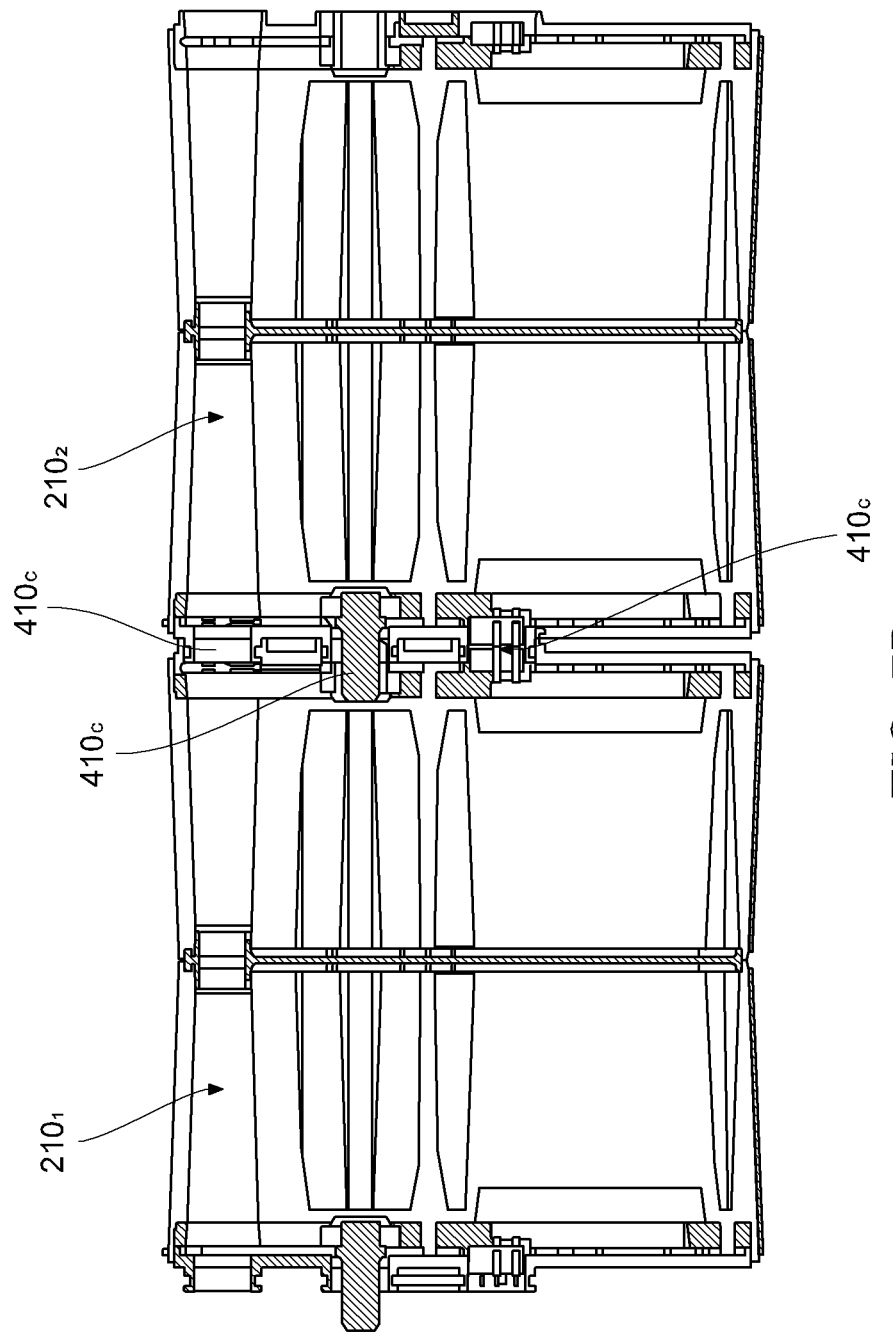

As discussed, exemplary battery pack 140 may include multiple battery modules 210. FIGS. 7A and 7B illustrate exemplary arrangements and couplings between two battery modules 210: 210$_1$ and 210$_2$. FIG. 7A depicts exemplary battery modules 210$_1$ and 210$_2$ separated but aligned for coupling. For example, battery modules 210$_1$ and 210$_2$ may be positioned as shown in FIG. 7A and then moved together until coupled as shown in the example in FIG. 7B. Generally, female connectors 410$_F$ on one of battery modules 210$_1$ and 210$_2$ may receive and engage male connectors 410$_M$ on the other of battery modules 210$_2$ and 210$_1$, respectively. One or more female-male connector pairings may be included on each of battery modules 210$_1$ and 210$_2$.

As shown in the example in FIG. 7A, a left side of battery modules 210$_1$ and 210$_2$ may have male connectors 410$_M$, and a right side of battery modules 210$_1$ and 210$_2$ may have female connectors 410$_F$. Alternatively, a mix of male connectors 410$_M$ and female connectors 410$_F$ may be used. Each female connector 410$_F$ may include an (elastomer) o-ring or other seal. Male connectors 410$_M$ and female connectors 410$_F$ may act only as connection points or may also be power connectors, coolant ports, etc.

FIG. 7B depicts a cross-sectional view of exemplary battery modules 210$_1$ and 210$_2$ coupled together. For example, male connectors 410$_M$ and female connectors 410$_F$ combine to form coupled connectors 410$_C$. As discussed, male connectors 410$_M$ and female connectors 410$_F$ may be power connectors or coolant ports of battery modules 210. For example, one of male connectors 410$_M$ may be a coolant output port of battery module 210$_2$, and one of female connectors 410$_F$ may be a female coolant output port of battery module 210$_1$. Thus, the male and female ports may be coupled, and the internal cooling channels of the battery modules may be connected, for example, forming the cooling system schematically illustrated in FIGS. 6A and 6B. Similarly, multiple battery modules 210 may be electrically connected via a male connector $410_M$ and a female connector $410_F$ when coupled together.

Figure 8:
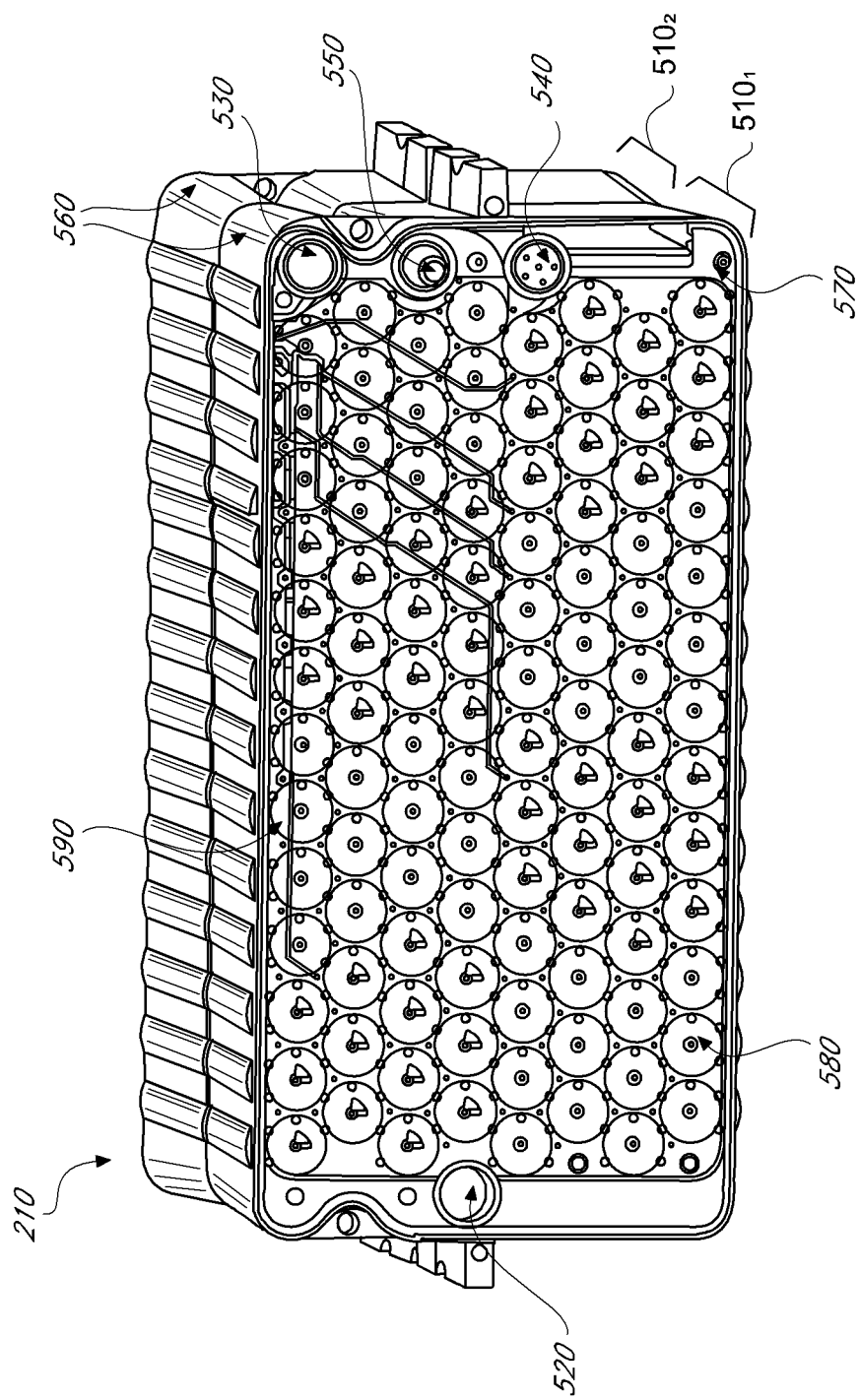
FIG. 8 is a diagrammatic illustration of the internal components of the module of FIG. 7A.

FIG. 8 is a diagrammatic illustration of an exemplary battery module 210. Battery module 210 may include two half modules $510_1$ and $510_2$, coolant input port 520, coolant output port 530, communications and low power connector 540, and/or main power connector 550.

Each of half modules $510_1$ and $510_2$ may also include an enclosure 560 for housing battery cells therein. Enclosure 560 may further include a plate 570 (discussed in greater detail with respect to FIG. 9).

Half modules $510_1$ and $510_2$ of battery module 210 may further include a current carrier 580 (discussed in more detail with reference to FIGS. 11 and 12-18), and may include one or more staking features 590, for example, a plastic stake, to hold current carrier 580 in battery module 210. Half modules $510_1$ and $510_2$ may be the same or may be different (e.g., half modules $510_1$ and $510_2$ may be mirror images of each other in some embodiments).

Coolant may be provided to battery module 210 at main coolant input port 520, circulated within battery module 210, and received at main coolant output port 530.

Communications and low power connector 540 may provide low power, for example, to electronics for data acquisition and/or control, and sensors. In some embodiments, communications and low power connector 540 may be at least partially electrically coupled to current carrier 580, for example, through electronics for data acquisition and/or control.

Each of coolant input port 520, coolant output port 530, communications and low power connector 540, and main power connector 550 may serve as male connectors $410_M$ and female connectors $410_F$.

Figure 9:
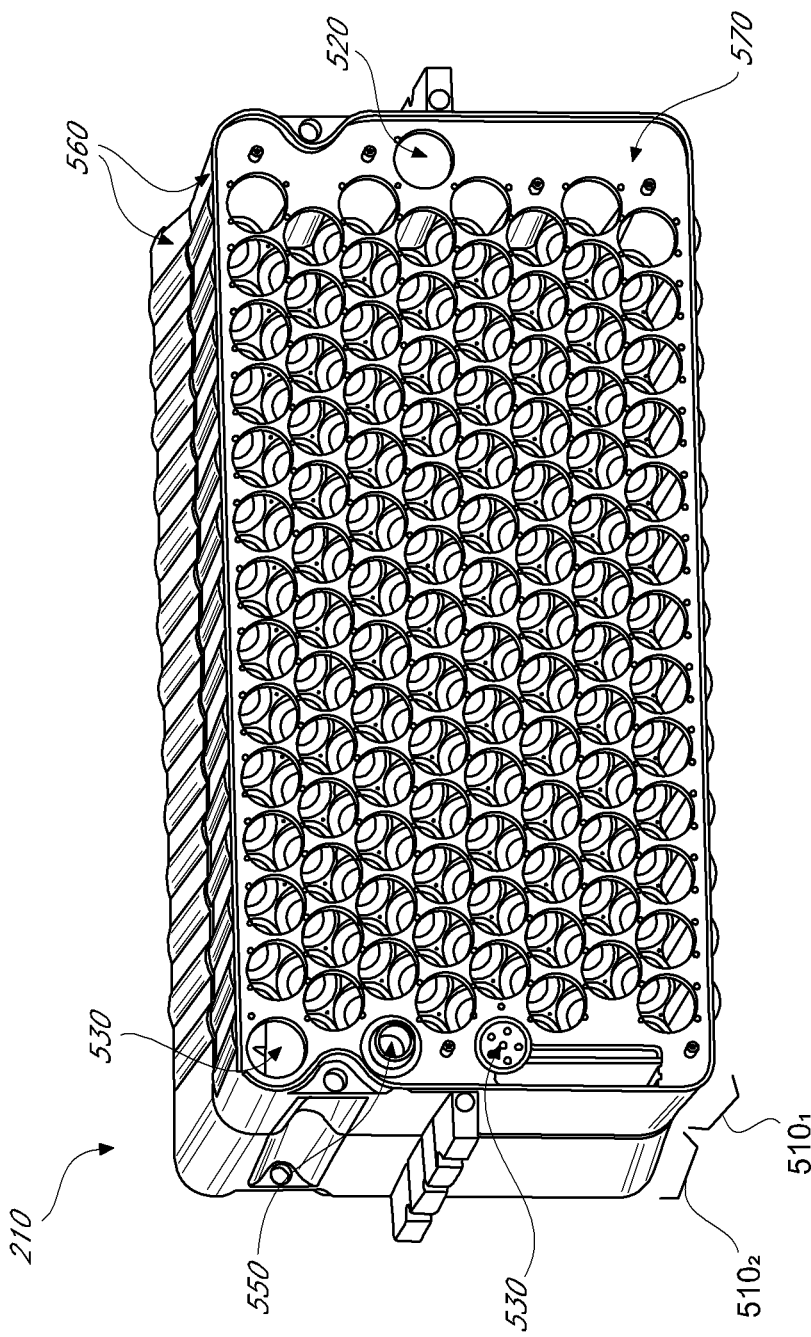
FIG. 9 is a diagrammatic illustration of an exemplary battery module of FIG. 8 with the current carrier and battery cells removed from one of the half modules of the battery module.

FIG. 9 is a diagrammatic illustration of battery module 210, with the battery cells and current carrier 580 removed from one of the half modules for illustrative purposes. As described, battery module 210 may include two half modules $510_1$ and $510_2$, main power connector 550, main coolant output port 530, main coolant input port 520, and communications and low power connector 540. Further, each of the half modules $510_1$ and $510_2$ may include enclosure 560.

Enclosure 560 may be made using one or more plastics having sufficiently low thermal conductivities. Respective enclosures 560 of each of the half modules may be coupled with one another other to form the housing for battery module 210. Enclosure 560 may additionally include a cover (not illustrated). Each enclosure 560 may further include plate 570 (e.g., a bracket). Plate 570 may include structures for securing the battery cells within enclosure 560 and maintaining the distance between battery cells.

Figure 10:
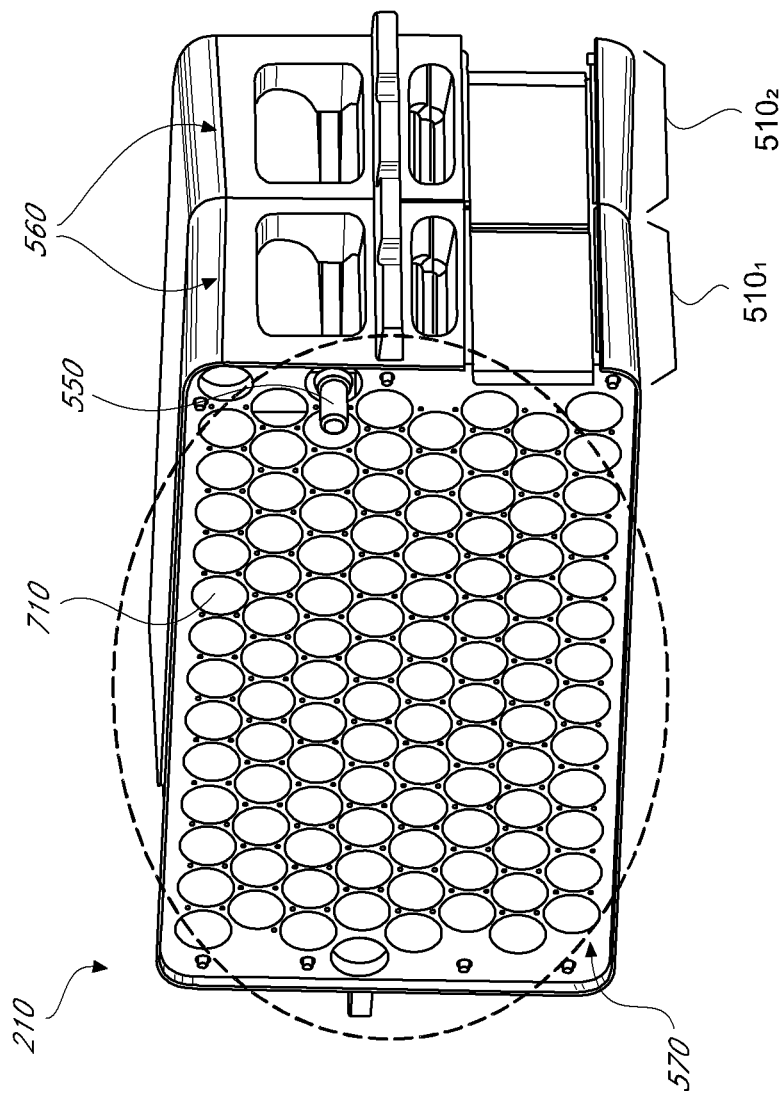
FIG. 10 is a diagrammatic illustration of an exemplary battery module of FIG. 8 with the current carrier removed from one of the half modules of the battery module.

FIG. 10 is a diagrammatic illustration of an exemplary battery module 210, with current carrier 580 removed from one of the half modules for illustrative purposes. Each half module may include at least one battery cell 710. Main power connector 550 may provide power from battery cells 710 to outside of battery module 210.

Figure 11:
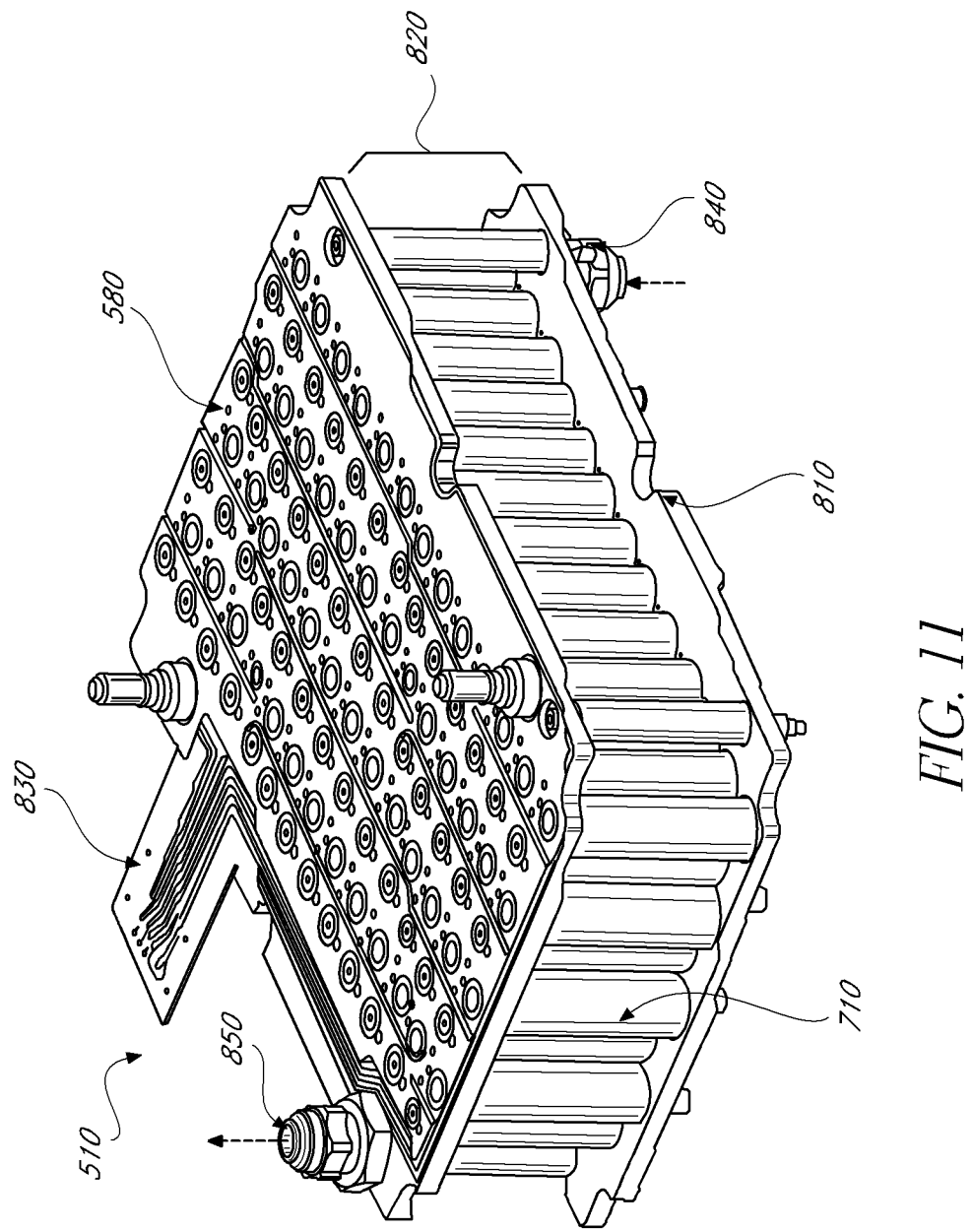
FIG. 11 is a diagrammatic illustration of an exemplary half module.

FIG. 11 is a diagrammatic illustration of half module 510 without enclosure 560. Half module 510 may include a coolant intake 840 and a coolant egress 850, which may allow for use of the coolant sub-system discussed with reference to FIGS. 6A and 6B. Half module 510 may further include an electrical interface 830, which may be electrically connected to current carrier 580. Electrical interface 830 may be coupled to communications and low power connector 540. Half module 510 may also include a plurality of battery cells 710. Battery cells 710 may have a cylindrical body, and may be disposed between current carrier 580 and blast plate 810 in space 820, such that an exterior side of each of battery cells 710 may not be in contact with the exterior sides of other (e.g., adjacent) battery cells 710.

Figure 12:
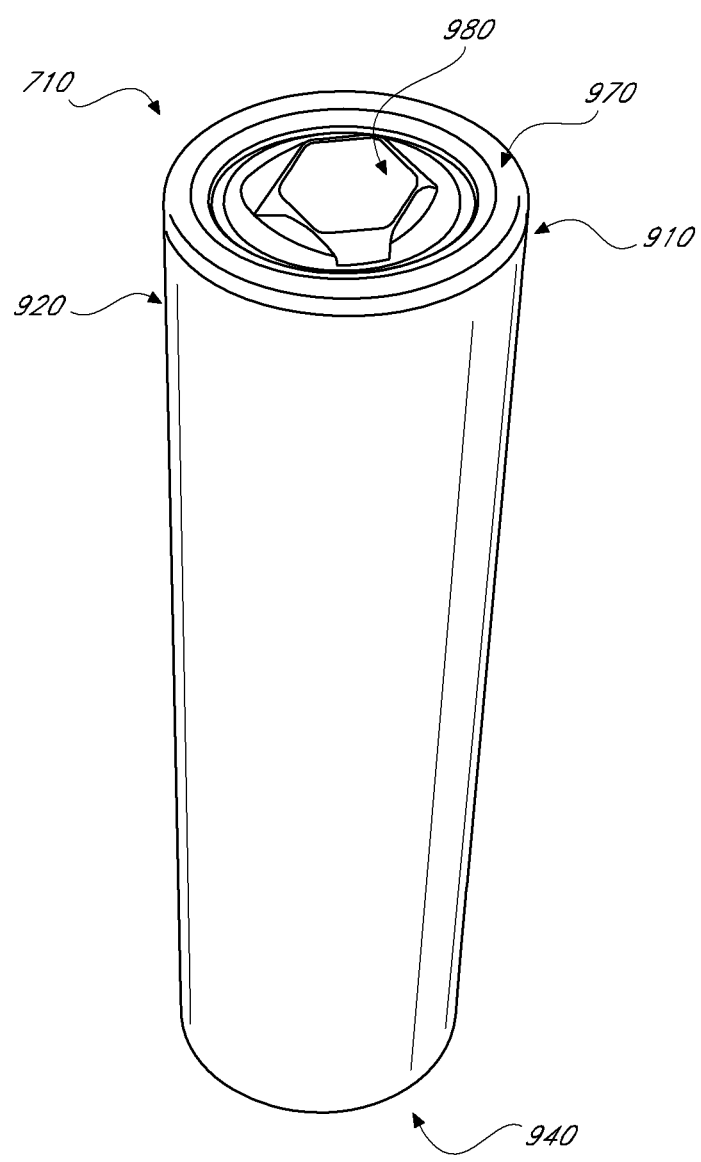
FIG. 12 is a diagrammatic illustration of an exemplary battery cell.

FIG. 12 depicts an exemplary battery cell 710. In some embodiments, battery cell 710 may be a lithium ion (li-ion) battery or any other type of battery. For example, battery cell 710 may be an 18650 type li-ion battery that may have a cylindrical shape with an approximate diameter of 18.6 mm and approximate length of 65.2 mm. Other rechargeable battery form factors and chemistries may additionally or alternatively be used. In various embodiments, battery cell 710 may include a first end 910, a can 920 (e.g., the cylindrical body), and a second end 940. Both an anode terminal 970 and a cathode terminal 980 may be disposed on first end 910. Anode terminal 970 may be a negative terminal of battery cell 710, and cathode terminal 980 may be a positive terminal of battery cell 710. Anode terminal 970 and cathode terminal 980 may be electrically isolated from each other by an insulator or dielectric.

Battery cell 710 may also include scoring on second end 940 to promote rupturing so as to effect venting in the event of over pressure. In various embodiments, all battery cells 710 may be oriented to allow venting into the blast plate 810 for both half modules.

Within half module 510, battery cells 710 may be disposed such that the cylindrical body of the battery cell may be parallel to the imaginary x-axis ("x-axis cell orientation"). According to some embodiments, x-axis cell orientation may offer additional safety and efficiency benefits. For example, in the event of a defect in half module 510 or battery module 210, the battery cells may be vented along the x-axis. Further, according to some embodiments, x-axis cell orientation may also be advantageous for efficient electrical and fluidic routing to each of battery module 210 in battery pack 140.

In addition, x-axis cell orientation may also be advantageous, according to some embodiments, for routing coolant (cooling fluid) in parallel to each of battery modules 210 in battery pack 140, for example, as may be seen in FIG. 11. Using the coolant systems described with reference to FIGS. 6A and 6B, coolant may enter half module 510 through coolant intake 840 and may exit through coolant egress 850. Coolant intake 840 and coolant egress 850 may each be male or female fluid fittings.

Channels 350B may be formed within the spaces between the cylindrical bodies of adjacent battery cells 710. Channels 350B may be metal tubes, but may also be spaces between the cylindrical bodies of battery cells 710, which may allow for higher battery cell density within battery module 210, in some embodiments by up to 15% or more. Channels 350B may or may not occupy the entire space between adjacent battery cells 710. Air pockets, which may reduce the weight of half module 510, may also be formed in the space between adjacent battery cells 710.

Such an exemplary parallel cooling system may be used to maintain the temperature of battery cells 710 within battery module 210 (and across battery back 140) at an approximately uniform level. According to some embodiments, the direct current internal resistance (DCIR) of each battery cell may vary with temperature; therefore, keeping each battery cell in battery pack 140 at a substantially uniform and predefined temperature range may allow each battery cell to have substantially the same DCIR. Voltage across each battery cell may be reduced as a function of its respective DCIR, and therefore each battery cell 710 in battery pack 140 may experience substantially the same loss in voltage. In this exemplary way, according to some embodiments, each battery cell 710 in battery pack 140 may be maintained at approximately the same capacity, and imbalances between battery cells 710 in battery pack 140 may be reduced and/or minimized.

According to some embodiments, each of half modules 510₁ and 510₂ may include the same number of battery cells 710. In various embodiments, each half module may include a number of battery cells 710 in the range of 20, 50, 100, 200, or more. For example, each half module may include one hundred-four battery cells 710. Battery cells 710 may be electrically connected via current carrier 580. For example, thirteen of battery cells 710 may form a group and may be electrically connected in parallel, with a total of eight of such groups of thirteen battery cells 710 electrically connected in series. This exemplary configuration may be referred to as "8S13P" (8 series, 13 parallel). Other combinations and permutations of battery cells 710 electrically coupled in series and/or parallel may be used. Exemplary grouping of the battery cells is discussed in greater detail in connection with a current carrier that provides electrical connection among the battery cells.

In various embodiments, battery half modules 510₁ and 510₂ may include a current carrier 580 configured to connect the terminals of a plurality of electrochemical battery cells. For example, the current carrier 580 may include a plurality of wires, a flex circuit, or the like. Various embodiments may include flex circuits as current carriers 580. A flex circuit may provide various advantages, such as flexibility, durability, and ease of manufacture (e.g., a flex circuit designed for a particular configuration of battery cells may be placed on top of the configured battery cells and secured in place, avoiding the need for additional wiring or other complex electrical connections. Without limiting the scope of current carriers that may be included with the battery systems described herein, an example embodiment of a current carrier will now be described.

Figure 13:
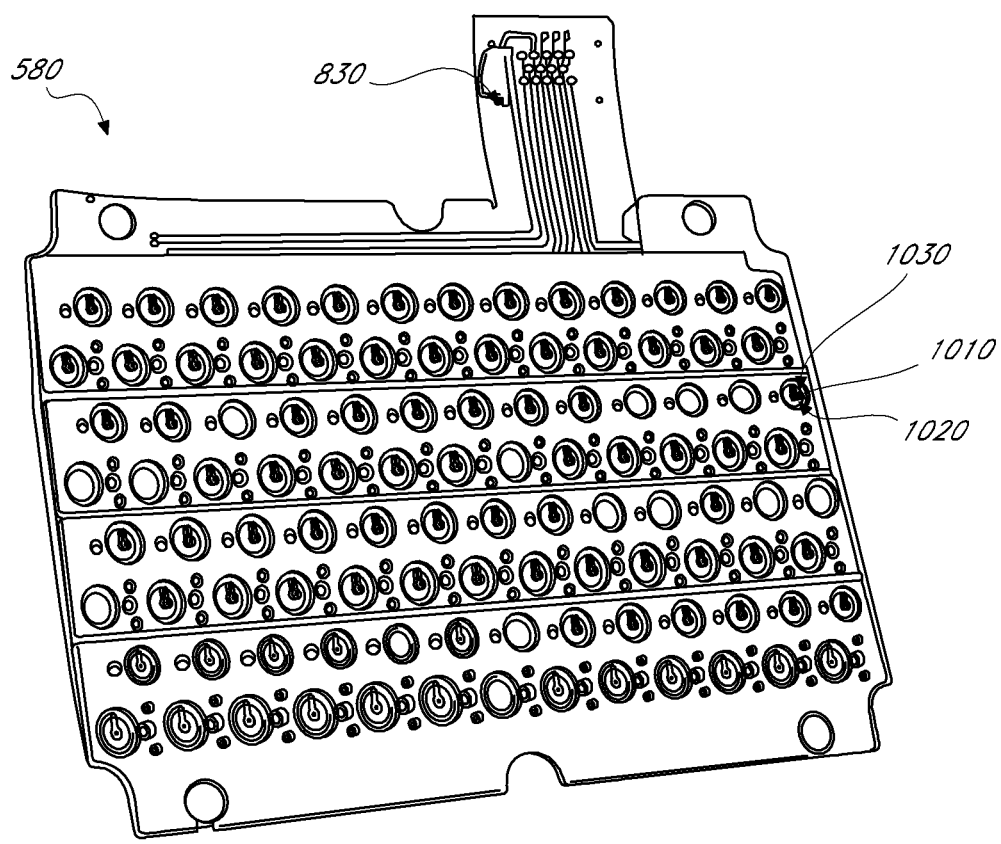
FIG. 13 is a diagrammatic illustration of an exemplary current carrier.

FIG. 13 is a diagrammatic illustration of an exemplary current carrier 580. In some embodiments, current carrier 580 may be generally planar, and may be of any size and dimensions depending on the size and dimensions of half module 510. Current carrier 580 may be in electrical connection with battery cells 710 and may conduct current between the battery cells through, e.g., a positive contact 1010, a negative contact 1020, and a fuse 1030. For example, positive contact 1010 may be in electrical contact with cathode terminal 980 and negative contact 1020 may be in electrical contact with anode terminal 970. Current carrier 580 may be electrically coupled to electrical interface 830, which may transport signals from current carrier 580, for example from a signal plane of current carrier 580. Electrical interface 830 may include an electrical connector (not shown). Current carrier 580 may also provide electrical connectivity to outside of battery module 210, for example, through main power connector 550.

Figure 14:
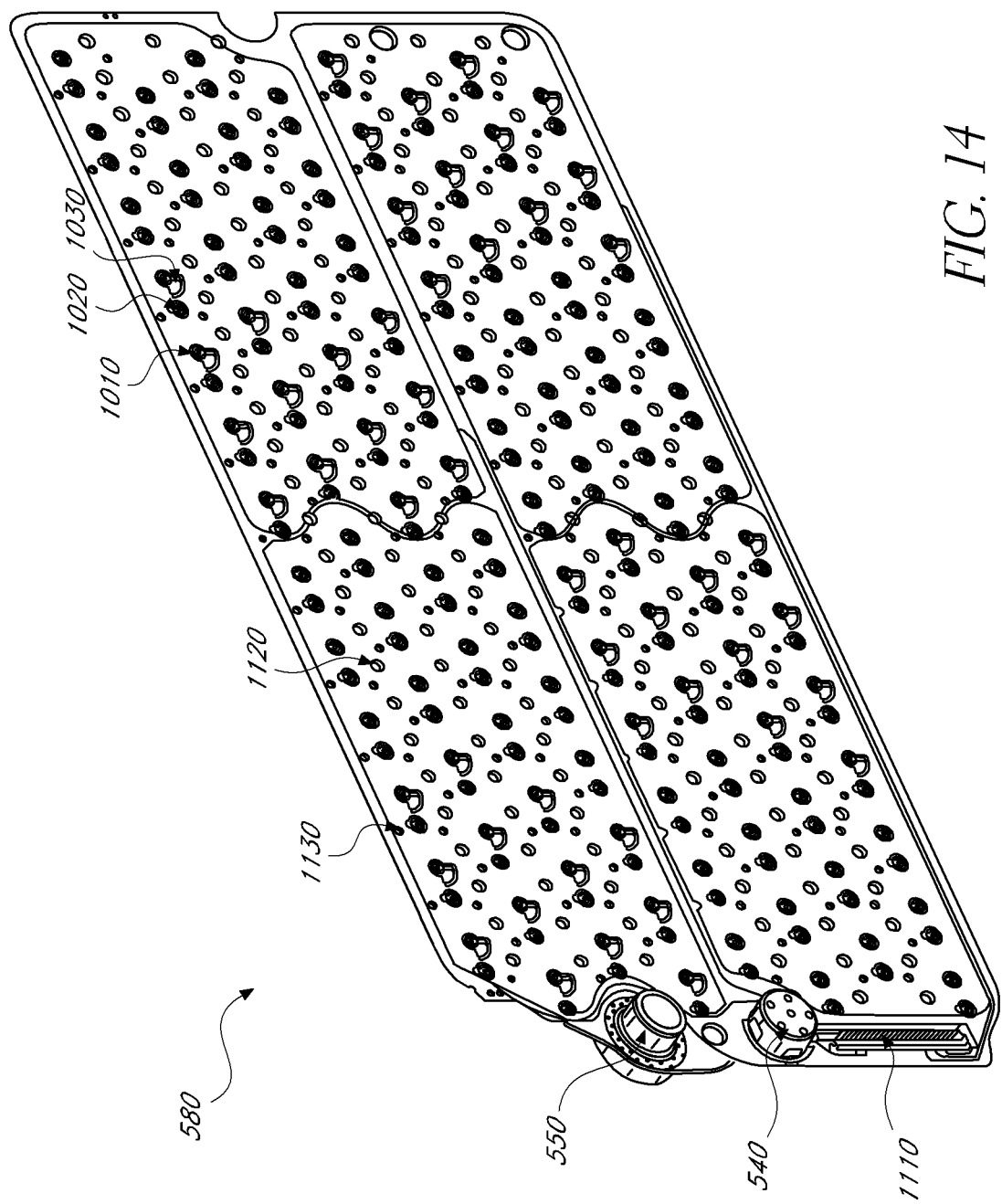
FIG. 14 is a diagrammatic illustration of an exemplary current carrier.

FIG. 14 is a second diagrammatic illustration of an exemplary current carrier 580. As shown in FIG. 14, main power connector 550 and low power connector 540 may be coupled to current carrier 580. According to some embodiments, current carrier 580 may also include a telemetry board connector 1110, medium holes 1120, and small holes 1130.

Telemetry board connector 1110 may communicatively couple a telemetry board (not shown) with current carrier 580 and communications and low power connector 540. For example, the telemetry board may include electronics for data acquisition and/or control, and sensors, such as for battery module telemetry.

Medium holes 1120 and small holes 1130 may be used to affix current carrier 580 to plate 570. For example, current carrier 580 may be hot staked to a plate 570 through small holes 1130 or medium holes 1120, or small holes 1130 or medium holes 1120 may be coupled to staking features 590. Alternatively or in addition, coolant may be circulated through medium holes 1120 and/or small holes 1130.

Current carrier 580 may include a printed circuit board and a flexible printed circuit. For example, the printed circuit board may variously include at least one of copper, FR-2 (phenolic cotton paper), FR-3 (cotton paper and epoxy), FR-4 (woven glass and epoxy), FR-5 (woven glass and epoxy), FR-6 (matte glass and polyester), G-10 (woven glass and epoxy), CEM-1 (cotton paper and epoxy), CEM-2 (cotton paper and epoxy), CEM-3 (non-woven glass and epoxy), CEM-4 (woven glass and epoxy), and CEM-5 (woven glass and polyester). By way of further non-limiting example, the flexible printed circuit may include at least one of copper foil and a flexible polymer film, such as polyester (PET), polyimide (PI), polyethylene naphthalate (PEN), polyetherimide (PEI), along with various fluoropolymers (FEP), and copolymers.

As shown in FIG. 14, current carrier 580 may also be composed of multiple sections in order to implement flexible configuration of electrical connection of battery cells 710.

Figure 15:
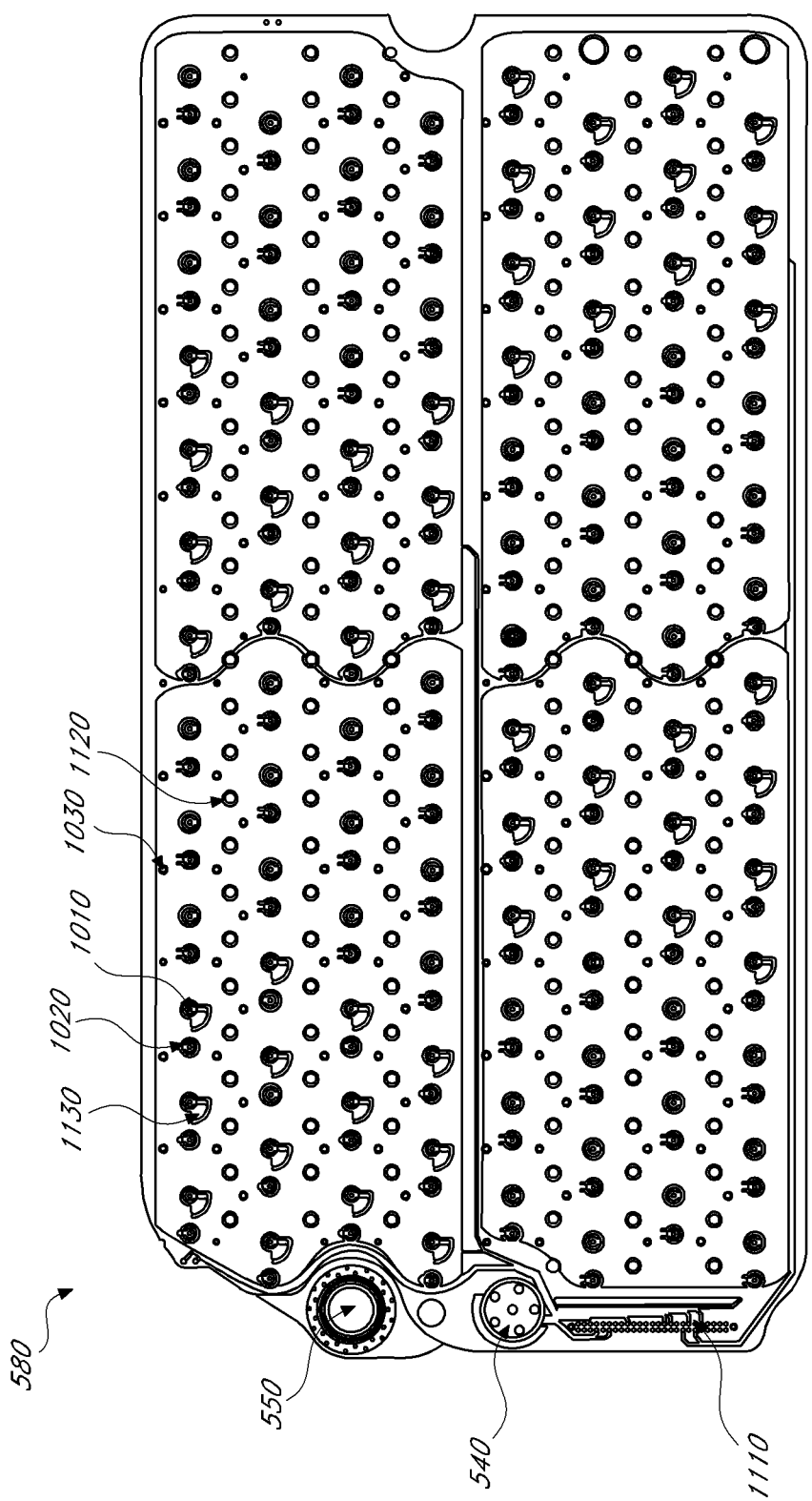
FIG. 15 is a front view of the exemplary current carrier of FIG. 14.
Figure 16:
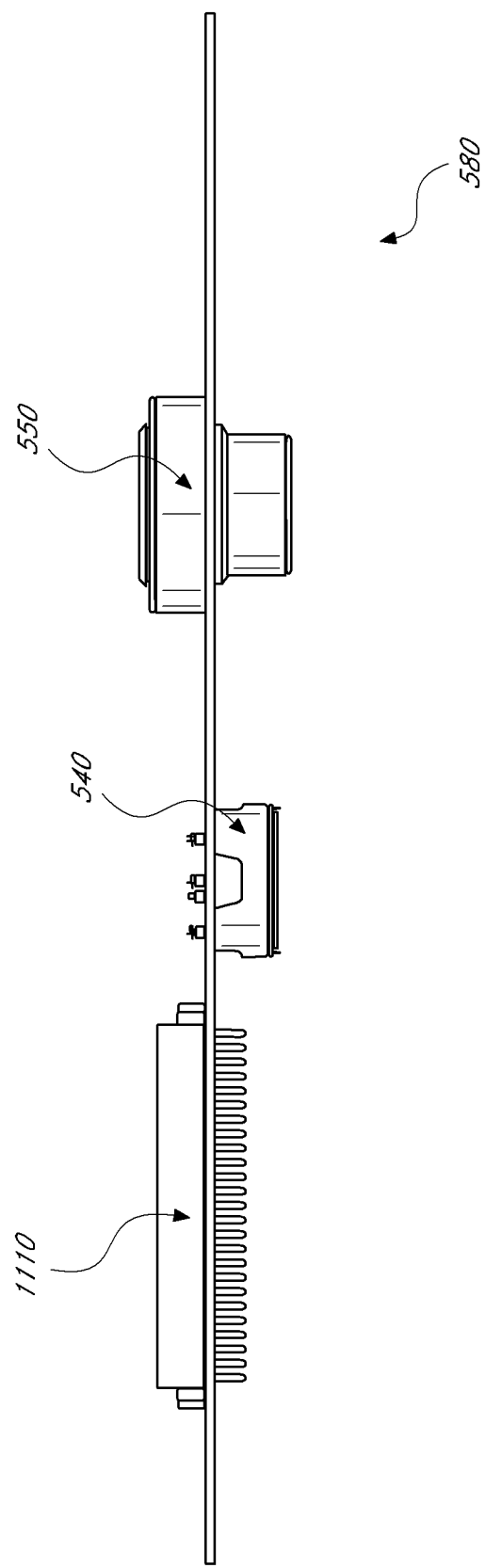
FIG. 16 is a side view of an exemplary current carrier of FIG. 14.

FIGS. 15 and 16 are alternative views of an exemplary current carrier 580. Current carrier 580 may include multiple layers, which may be sandwiched between dielectric isolation layers (e.g., made of polyimide).

Figure 17:
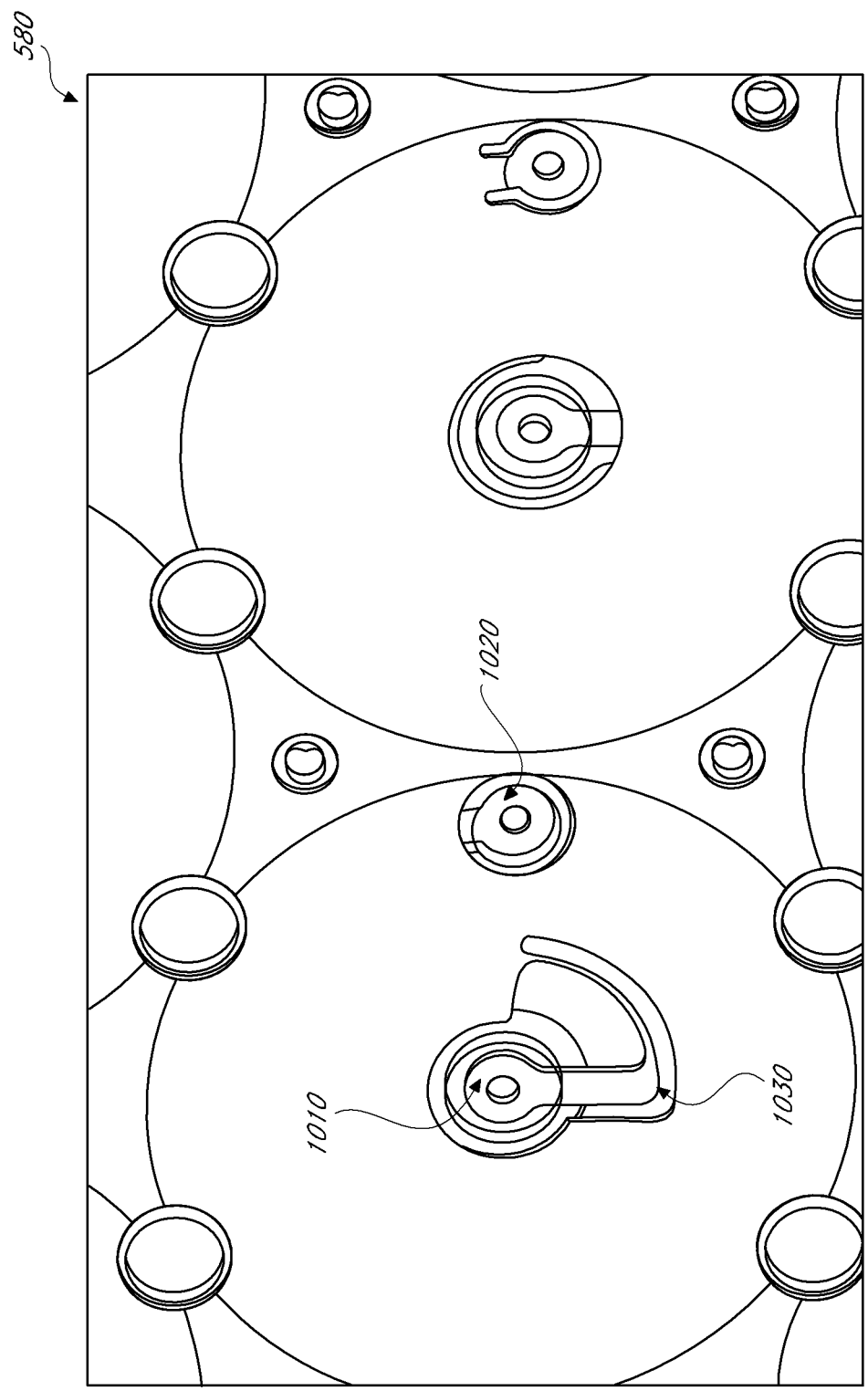
FIG. 17 is a detailed diagrammatic illustration of an exemplary current carrier.

According to some embodiments, current carrier 580 may provide electrical connectivity between and among battery cells 710. As noted, current carrier 580 may be electrically connected to a plurality of battery cells 710, and may connect battery cells 710 in series or in parallel. FIG. 17 is a detailed diagrammatic illustration of an exemplary current carrier 580. FIG. 17 depicts exemplary positive contact 1010, negative contact 1020, and fuse 1030. Current carrier 580 may include a plurality of each of positive contacts 1010, negative contacts 1020, and fuses 1030.

Positive contact 1010 and negative contact 1020 may be separate. The position and shape of positive contact 1010 and negative contact 1020 may vary based on the shape of battery cell 710. In some embodiments, positive contact 1010 may be welded (e.g., laser welded) to a cathode terminal 980 of battery cell 710, and negative contact 1020 may be welded (e.g., laser welded) to an anode terminal 970 of battery cell 710. In some embodiments, the welded connection may have on the order of 5 milli-Ohms of resistance or less. In contrast, electrically coupling the elements using ultrasonic bonding of aluminum bond wires may have on the order of 10 milli-Ohms resistance. Welding may also have lower resistance for greater power efficiency and may take less time to perform than ultrasonic wire bonding.

Current carrier 580 may be configured such that a positive contact 1010 and a negative contact 1020 may be connected to the respective cathode and anode terminals of respective battery cells 710, for example, when the first end 910 of each battery cells 710 is oriented in the same direction. Therefore, two battery cells 710 may be connected in series with each other when negative contact 1020 connected to the anode of the first battery cell is electrically connected with the positive contact 1020 connected to the cathode of the second battery. Likewise, two battery cells 710 may be connected in parallel with each other when negative contacts 1020 connected with the cells are electrically connected with each other.

Accordingly, by designing the electrical connectivity of positive contacts 1010 and negative contacts 1020 on current carrier 580, battery cells 710 may be connected in series or in parallel. For example, a group of battery cells 710 may be connected in parallel via a plurality of electrically connected positive contacts 1010 of current carrier 580, and the respective plurality of electrically connected negative contacts 1020 of current carrier 580. According to some embodiments, a first group and a second group of batteries 710 may be connected in series if negative contacts 1020 of the first group are electrically connected with positive contacts 1010 of the second group. According to some embodiments, the number of battery cells in the first group and the number of battery cells in the second group may be the same or different.

Current carrier 580 may also include fuse 1030, which may be formed from part of a metal layer (e.g., copper, aluminum, etc.) of current carrier 580. In some embodiments, fuse 1030 may be formed (e.g., laser etched) in a metal layer to dimensions corresponding to a type of low-resistance resistor, and may act as a sacrificial device to provide overcurrent protection. For example, in the event of thermal runaway of one of battery cell 710 (e.g., due to an internal short circuit), the fuse may "blow," and may break the electrical connection to the battery cell 710 and electrically isolate the battery cell 710 from current carrier 580.

Figure 18A:
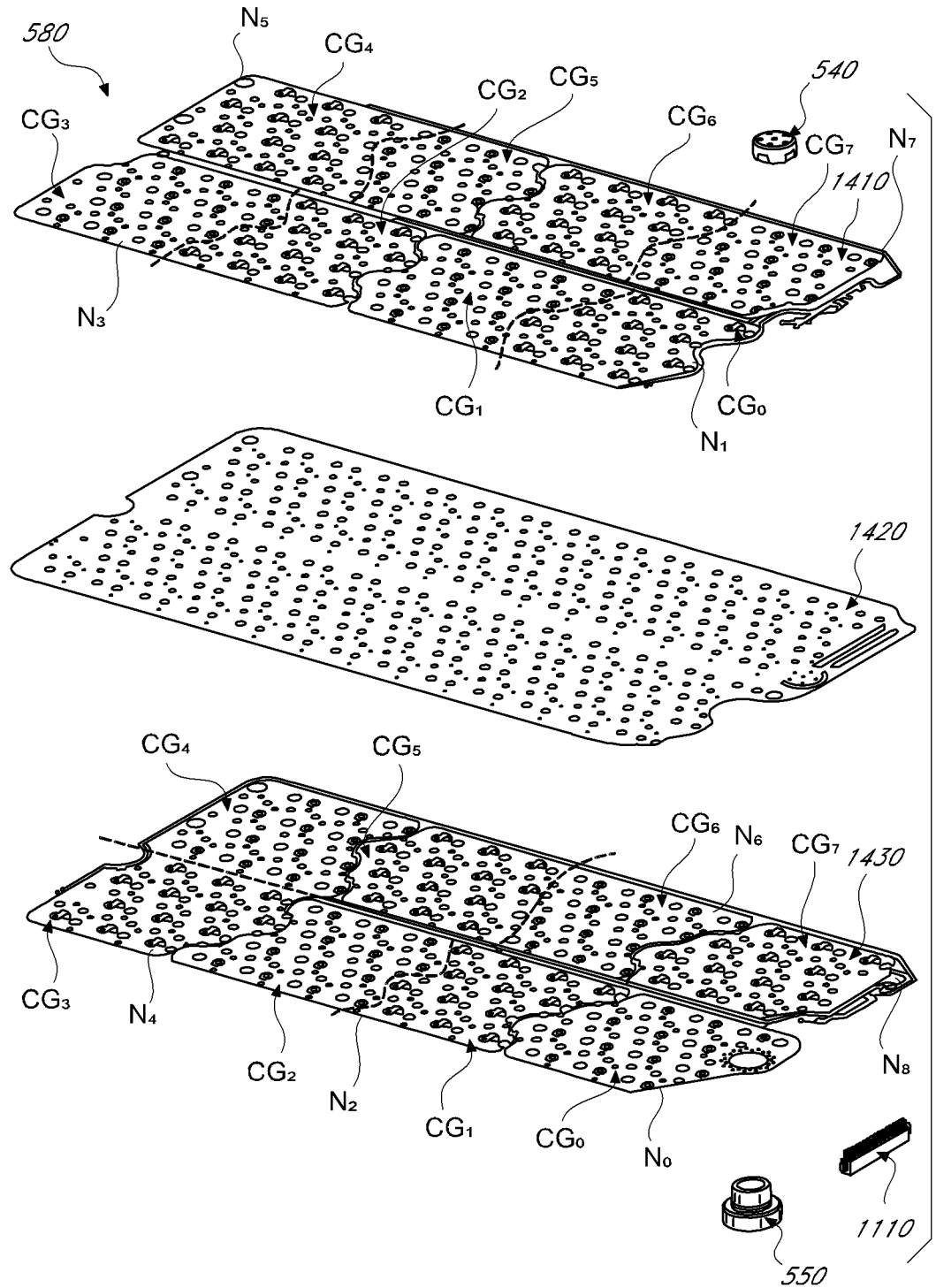
FIG. 18A is an exploded view of an exemplary current carrier.
Figure 18B:
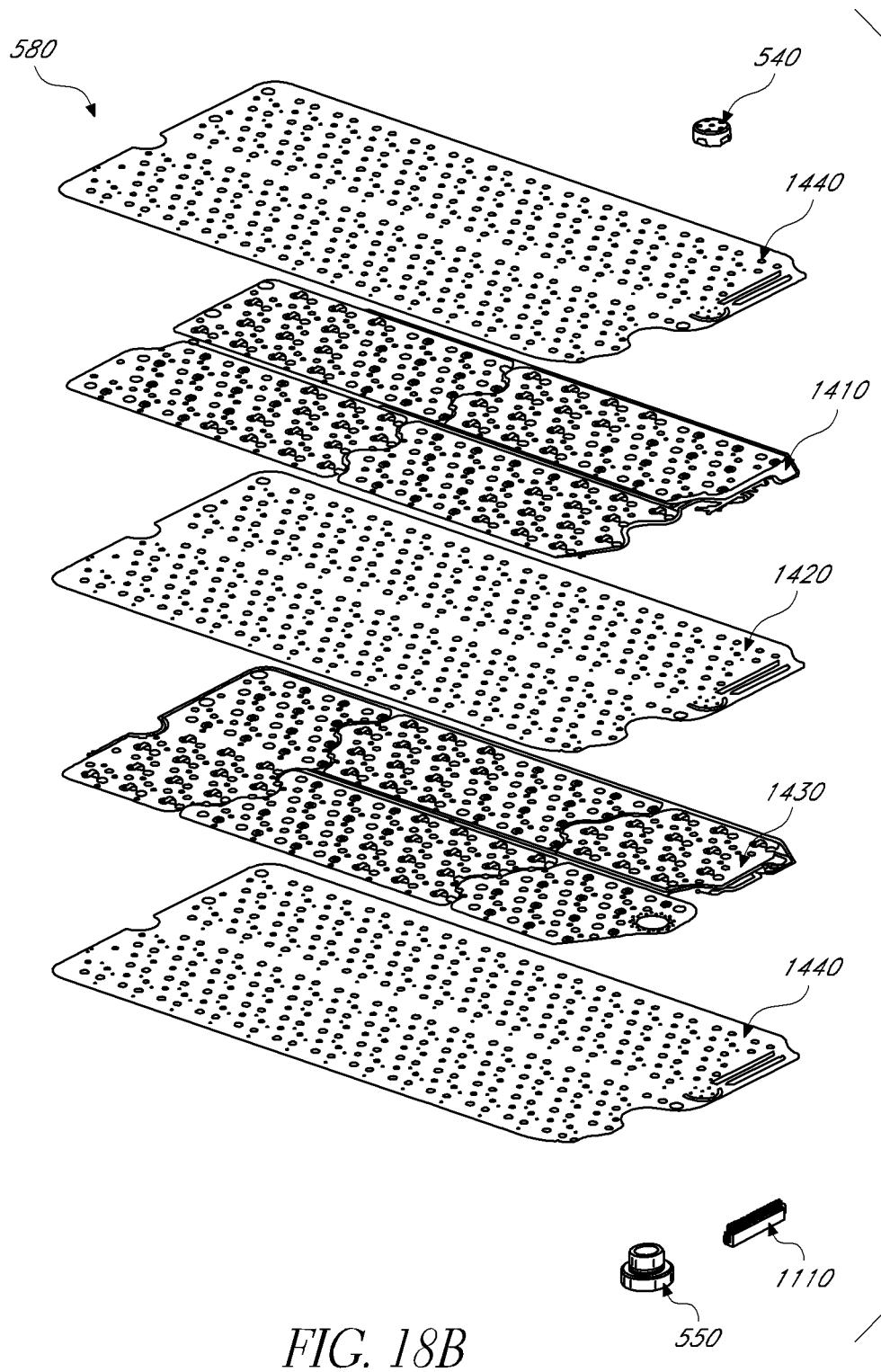
FIG. 18B is another exploded view of an exemplary current carrier.

FIG. 18A illustrates an exemplary current carrier 580. Current carrier 580 may include main power connector 550, low power connector 540, and/or telemetry board connector 1110. Current carrier 580 may include a first layer 1410, a base layer 1420, which may provide dielectric isolation, and a second layer 1430. As depicted in FIG. 18B, one or more isolation layers 1440 may also be included in current carrier 580. Current carrier 580 may further include a signal plane, which in some embodiments may include signal traces and may be used to provide battery module telemetry (e.g., battery cell voltage, current, state of charge, and/or temperature from optional sensors on current carrier 580) to outside of battery module 210. Alternatively, the signal plane may be integrated into one or more layers of current carrier 580 or may be omitted.

First layer 1410 and second layer 1430 may be disposed on a respective first side and second side of base layer 1420.

Figure 18C:
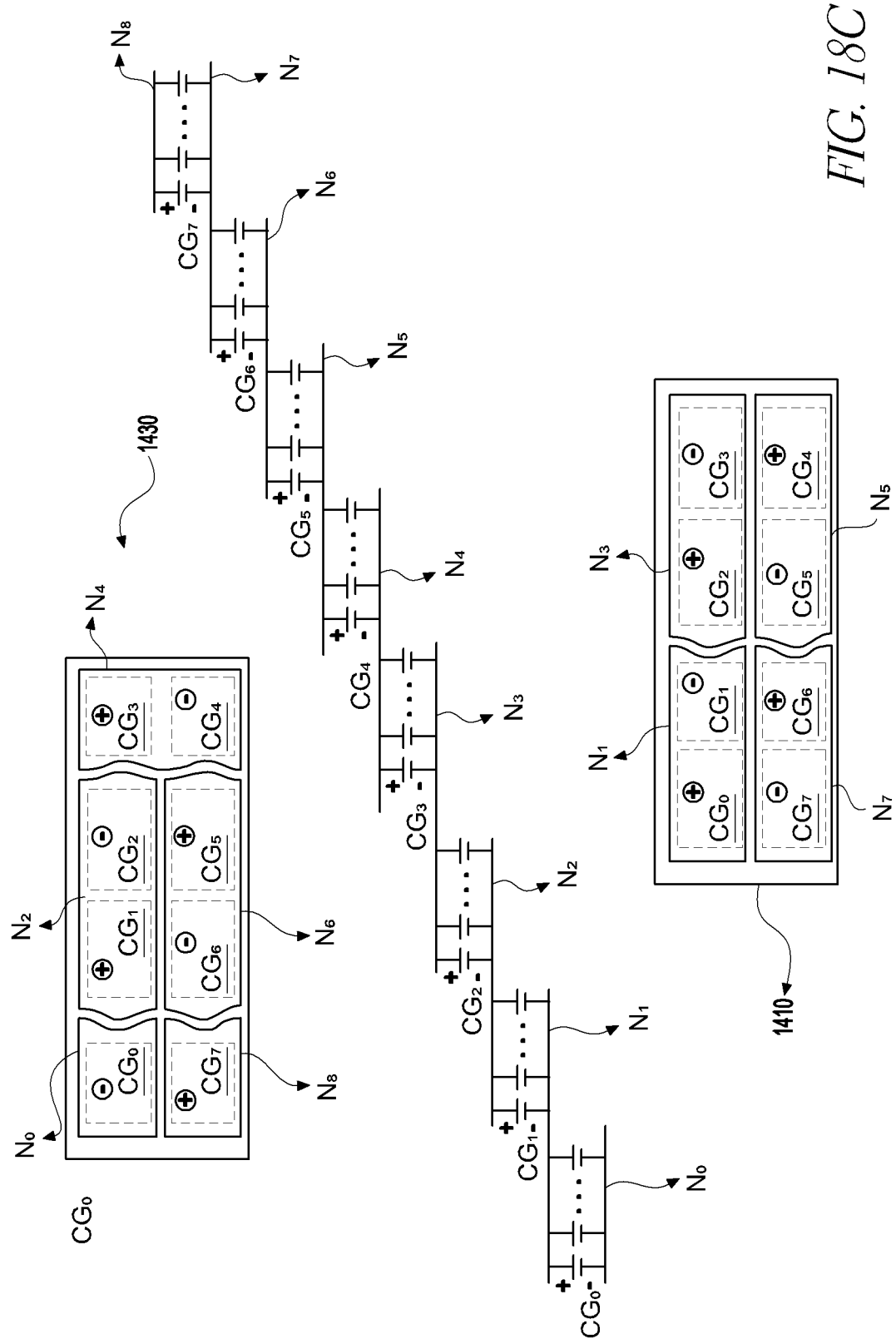
FIG. 18C is a detailed diagrammatic illustration of the circuit design of an exemplary current carrier.

As shown in FIGS. 18A and 18C, first layer 1410 may include multiple sections. Similarly, second layer 1430 may include multiple sections. Each section may include a group of contacts electrically connected with the anodes/cathodes of the respective battery cells 710 in a cell group. Each section may have the same number of contacts or may have a different number of contacts. The contacts within each section may be positive contacts 1010 or negative contacts 1020.

First layer 1410 and second layer 1430 may include sections of any shape or dimensions, depending on the desired positioning of battery cells 710, the desired shape and size of battery module 210, and the desired electrical connection between and among battery cells 710. First layer 1410 and second layer 1430 may be composed of metal or other conductive materials known in the art. Both first layer 1410 and second layer 1430 may also have more or fewer sections than depicted in FIGS. 18A and 18C. Second layer 1430 may have the same number of sections as first layer 1410 or may have a different number of sections.

When used in half module 510, current carrier 580 may electrically connect the plurality of battery cells 710 in half module 510. The plurality of battery cells 710 in half module 510 may be divided into groups and may be oriented such that the first end 910 of each battery cell 710 is oriented in the same direction. For example, according to some embodiments, the plurality of battery cells 710 may be divided into eight cell groups $CG_0$ to $CG_7$. According to some embodiments, the number of battery cells 710 in each cell group may be the same. It is also contemplated that the number of battery cells 710 in a cell group may be different than the number of battery cells 710 in another cell group. The anode terminal 970 of each of battery cell 710 within a first cell group may be electrically connected to a negative contact 1020 on first layer 1410 of current carrier 580. The cathode terminal 980 of each battery cell 710 within the first cell group may be electrically connected to a positive contact 1010 on second layer 1430. The contacts that are electrically connected together form an equipotential surface (referred to as a "node"). Battery cells 710 within each cell group are thus connected between two nodes.

For example, a first cell group $CG_0$ may be electrically coupled between node $N_0$ on second layer 1430 and node $N_1$ on first layer 1410. Thus, battery cells 710 in the cell group $CG_0$ are electrically connected in parallel.

A second cell group $CG_1$ may be electrically coupled between node $N_1$ on first layer 1410 and node $N_2$ on second layer 1430. Thus, battery cells 710 in the second cell group $CG_1$ are also electrically connected in parallel. Battery cells 710 of the first cell group $CG_0$ and battery cells 710 of the second cell group $CG_1$ are electrically connected in series.

Similarly, a third cell group $CG_2$ may be electrically coupled between node $N_2$ on second layer 1430 and node $N_3$ on first layer 1410. Thus, battery cells 710 within the third cell group $CG_2$ may be electrically connected in parallel. Battery cells 710 of the third cell group $CG_2$ and the second cell group $CG_1$ are electrically connected in series.

The remaining cell groups $CG_3$ to $CG_7$ may be similarly connected. As a result, battery cells 710 within each of the eight cell groups may be electrically connected in parallel and the respective cell groups may be electrically connected in series. This exemplary circuitry is depicted in FIG. 18C.

The exemplary circuit configuration described above may increase the number of battery cells within a compact package. For example, all battery cells 710 within half module 510 may be oriented in the same direction, and still connected via this exemplary three-dimensional circuit design. With the disclosed current carrier 580, the series and parallel connections may be realized by alternating positive and negative contact groups between the multiple nodes within layers 1410 and 1430 of current carrier 580, rather than physically reorienting battery cells 710. This exemplary configuration may also result in simplified manufacturing.

Figure 19A:
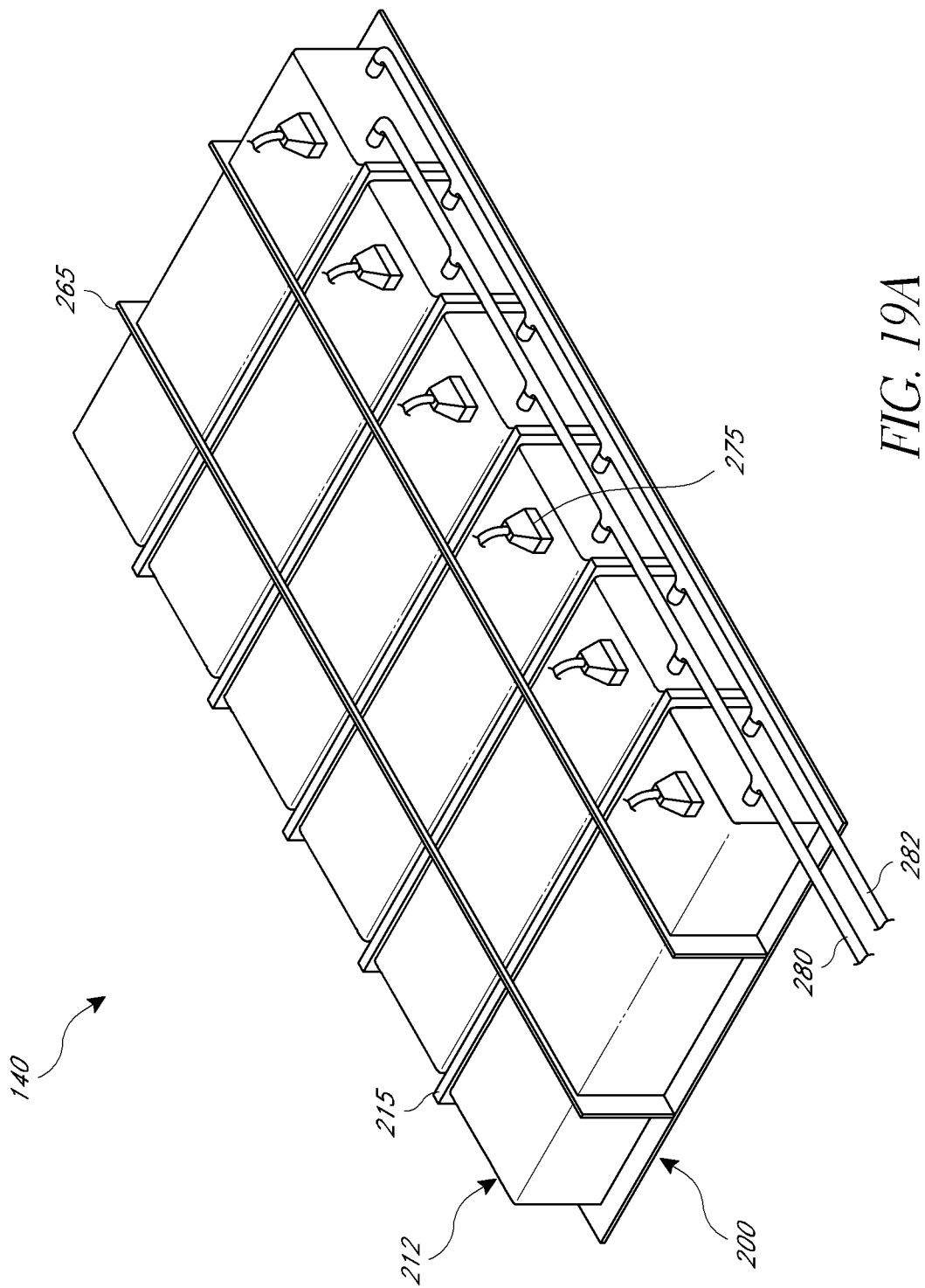
FIGS. 19A-B depict a battery pack enclosure and a plurality of modular battery strings in accordance with an exemplary embodiment.
Figure 19B:
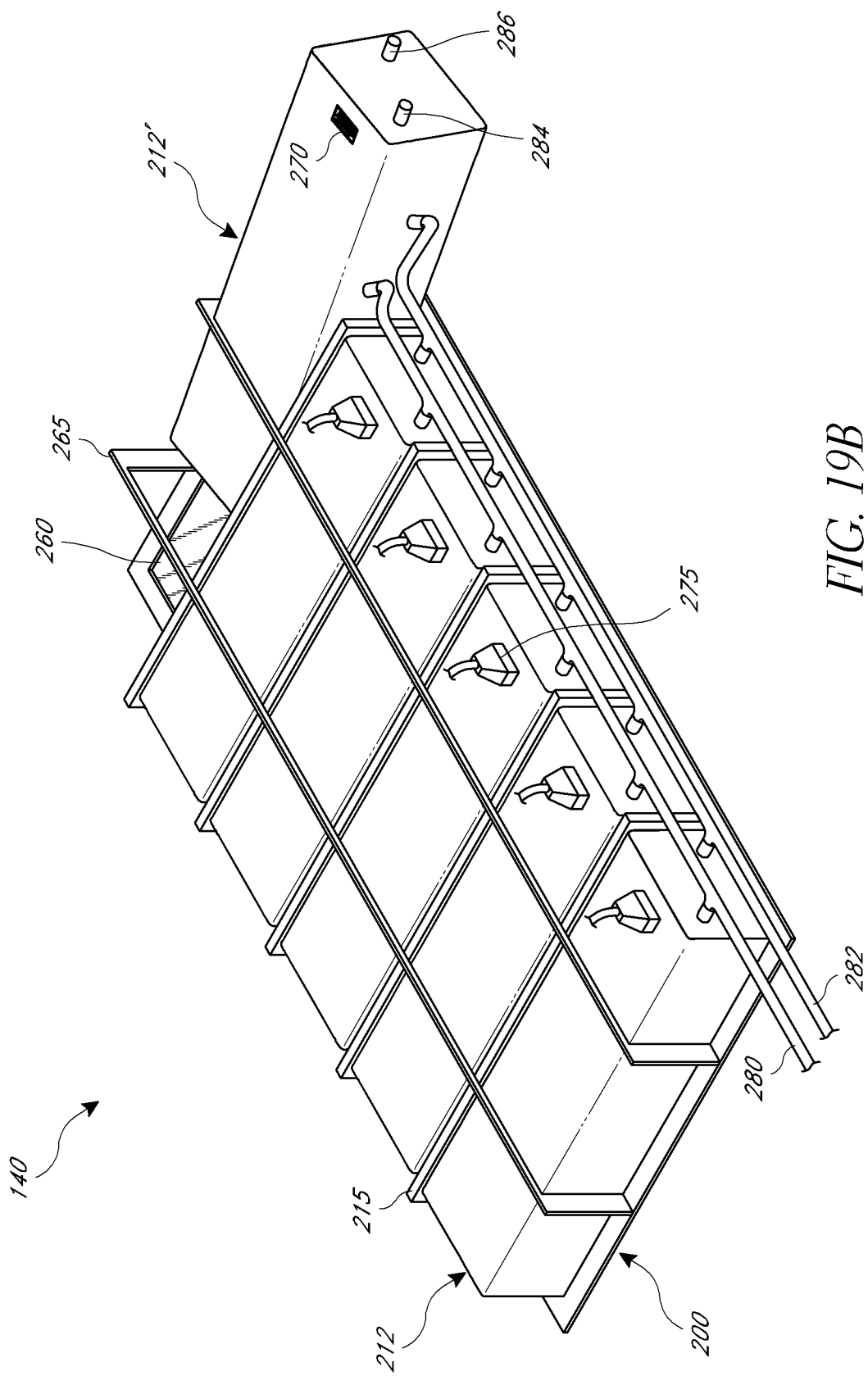

Referring now to FIGS. 19A-B, modular battery pack systems will be described. As discussed above, a battery pack 140 may include one or more battery strings 212. In some embodiments, battery strings 212 may be configured to be removed, inserted, and/or replaced individually. Modular battery strings 212 as described herein may provide several advantages for electric vehicle operation. For example, a battery string 212 that is malfunctioning or otherwise in need of repair or service may be removed by a technician or owner. The removed string 212 may be replaced with a functional string 212, or the vehicle may be operated with one fewer string until the removed string 212 is repaired or replaced. Modular battery strings 212 may also be utilized for convenient battery swapping (e.g., replacing a discharged or partially discharged battery string 212 for a mostly charged or fully charged replacement string 212) to reduce time spent recharging.

The battery pack 140 depicted in FIGS. 19A-B includes six strings 140, which may be mounted in a rack or enclosure 200. The enclosure 200 may include one or more lower support elements such as a tray 260 positioned to support the strings 212 from below. The enclosure 200 may further include one or more upper support elements 265 positioned so as to prevent the strings 212 from moving upward during operation of the vehicle. Upper support elements 265 and/or tray 260 may include positioning members (not shown), such as protrusions or depressions, configured to maintain strings 212 in place and/or inhibit movement of the strings by connecting with complementary structures of strings 212. For example, the positioning members may include bolts or similar structures, with complementary structures including fasteners that may accommodate and/or secure the bolts. In some embodiments, the enclosure 200 may include one or more thermal barriers 215 including any suitable thermally insulating material, each thermal barrier 215 disposed between two of the strings 212 so as to prevent an overheating string 212 from causing neighboring strings 212 to overheat.

The strings 212 may be connected in parallel, in series, or in a combination of parallel and series connections. Each string 212 may have a positive high voltage connector (not shown) and a negative high voltage connector (not shown) for charging and for delivery of electricity to systems of the vehicle. In some embodiments, a current carrier (not shown), such as a bus bar or flexible conduit, may be located within or adjacent to one or more lower support elements such as tray 260 or upper support elements 265. For example, current carriers disposed within tray 260 may allow connections with the high voltage connectors to be made through or near a positioning member (not shown) and assisted by gravity.

Additional electrical contact with the battery strings 212 may be made through an auxiliary connector 270. The auxiliary connector 270 may permit connection between internal components (not shown) of the battery strings 270 and data or low-voltage power systems of the vehicle. For example, the auxiliary connector 270 may include a CAN connector for connection between monitoring and/or control circuitry (not shown) within the battery string 212 and a CAN bus or other wiring connector 275 of the vehicle. The auxiliary connector 270 may also include a low-voltage power supply, such as from a low voltage battery, DC-to-DC converter, or other vehicle power supply, to provide electrical power to components within the batter string 212, such as monitoring and control circuitry (e.g., string control units, battery module monitoring boards, etc.) and/or circuit disconnection elements (e.g., magnetic contactors, fusible elements, etc.). In some embodiments, the auxiliary connector 270 may include a single connector configured to transmit both power and data to and/or from internal components of the battery string 212.

The battery pack 140 may further include a cooling system, such as a liquid cooling system, to control the operating temperature of components within the battery strings 212. The cooling system may include one or more conduits (e.g., coolant supply conduit 280 and coolant return conduit 282) configured to carry liquid coolant to and from the battery strings. Conduits 280 and 282 may connect to the battery strings 212 at inlets 284 and outlets 286, which may include sealable valves, dry breaks, or other breakable liquid connections. In some embodiments, the conduits 280 and 282 may be manually connectable, such that a user can connect a supply conduit 280 to the coolant inlet 284 and connect a return conduit 282 to the coolant outlet 286 after placing a battery string 212 into an available space within the battery pack 140. The cooling system may further include elements such as a heat exchanger, pump, reservoir, or other components (not shown) in fluid communication with the conduits, to store, circulate, and cool the liquid coolant.

Individual strings 212 of the battery pack 140 may be removable, insertable, and/or replaceable. For example, in a battery pack 140 including six strings 212 as depicted in FIG. 19A, it may be desired to remove one or more strings 212, such as for repair, replacement, service, inspection, external charging, battery swapping, or for any other purpose. The string 212 to be removed may first be disconnected by disengaging connections such as a vehicle wiring connector 275, coolant conduits 280 and 282, and high-voltage connectors (not shown). The string 212 may then be removed, such as by vertical movement, lateral movement, or a combination of vertical and lateral movement (e.g., lifting one or both ends of the string 212 and sliding the string 212 out of the enclosure 200). In some embodiments, disconnection of one or more connections may be accomplished by the action of removing the battery string 212 and not by a separate disconnection step. FIG. 19B depicts a battery pack 140 during the removal process described herein. In FIG. 19B, one string 212' is partially removed from the battery pack 140 and enclosure 200, having been disconnected from a vehicle wiring connector 275 and coolant conduits 280 and 282, and slid laterally for removal from the enclosure 200. After the string 212' has been removed, a replacement string 212 or the same string 212' may be inserted into the open space within the enclosure 200, such as by reversing the steps listed above. For example, the battery string 212 may be slid into the opening in the enclosure 200 to the position depicted in FIG. 19A. The vehicle wiring connector 275, coolant conduits 280 and 282, and high-voltage connections (not shown) may be connected to provide desired functionality of the battery string 212.

Figure 20A:
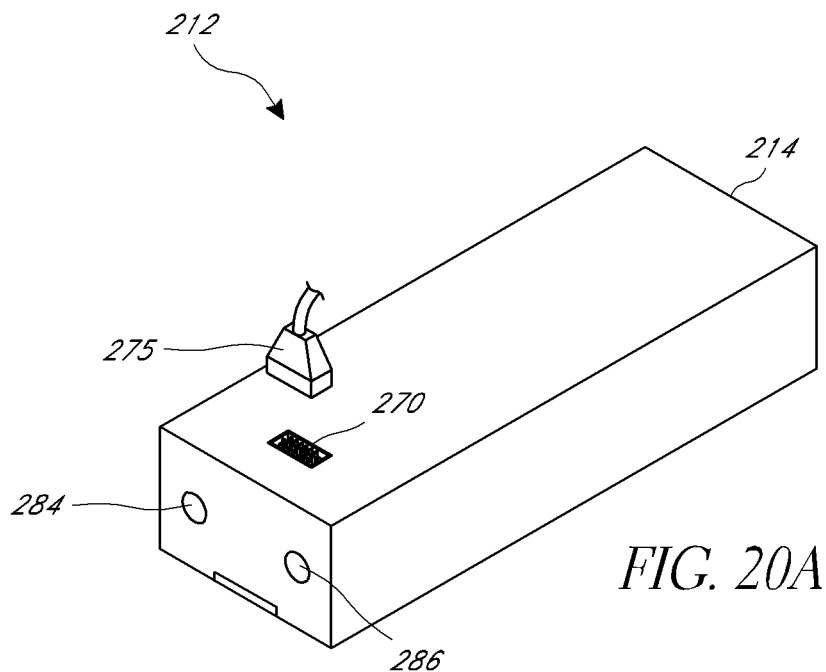
FIGS. 20A-B depict exterior views of a modular battery string in accordance with an exemplary embodiment.
Figure 20B:
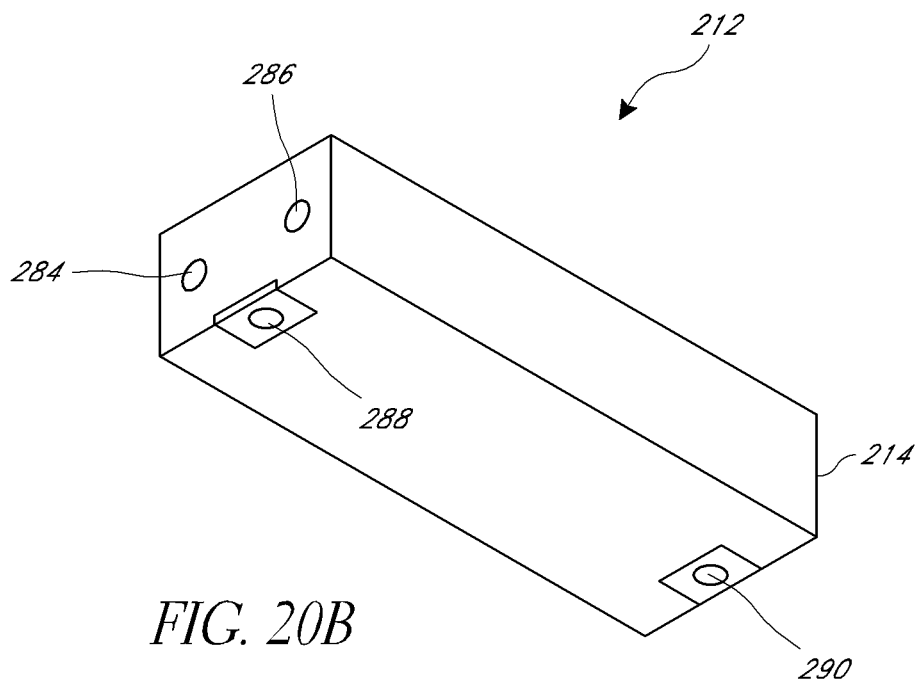

FIGS. 20A-B depict exterior views of a modular battery string 212 in accordance with an exemplary embodiment. FIG. 20A depicts an upper perspective view of a battery string 212, while FIG. 20B depicts a lower perspective view. In some embodiments, a battery string 212 may be enclosed within a protective housing 214. Housing 214 may include materials such as metals, plastics, or other materials configured to support and/or protect battery modules (not shown) within the battery string 212. The battery string 212 may further include several external connections. For example, the battery string 212 may include an auxiliary connector 270 configured to accommodate a connection to a vehicle wiring connector 275, such as a CAN bus or other data network, a low-voltage connection to power monitoring and control circuitry (not shown) within the string 212, or the like. The battery string 212 may also include a coolant inlet 284 and a coolant outlet 286, which may include sealing components such as dry breaks so as to prevent coolant within the string 212 from leaking when the string 212 is disconnected from a cooling system. Positive high-voltage connector 288 and negative high-voltage connector 290 may be located on an exterior surface of the string 212, such as on the bottom. In some embodiments, the positive and negative high-voltage connectors 288, 290 may be spaced so as to avoid accidental creation of a short circuit between the connectors 288, 290. All external battery string connections described herein (e.g., auxiliary connector 270, coolant inlet 284 and outlet 286, high-voltage connectors 288, 290, etc.) may include openings in the material of the string housing 214 and/or additional reinforcing or protecting structures such as cable entry systems, cable connectors, waterproof wiring connectors, cable harnesses, valves, dry breaks, or the like, to permit connections between internal components of the battery string 212 and external components within the vehicle. In various embodiments, any of the auxiliary connector 270, coolant inlet 284, coolant outlet 286, and high-voltage connectors 288, 290 may be located on a top surface, a bottom surface, or a side surface of the housing 214.

Figure 20C:
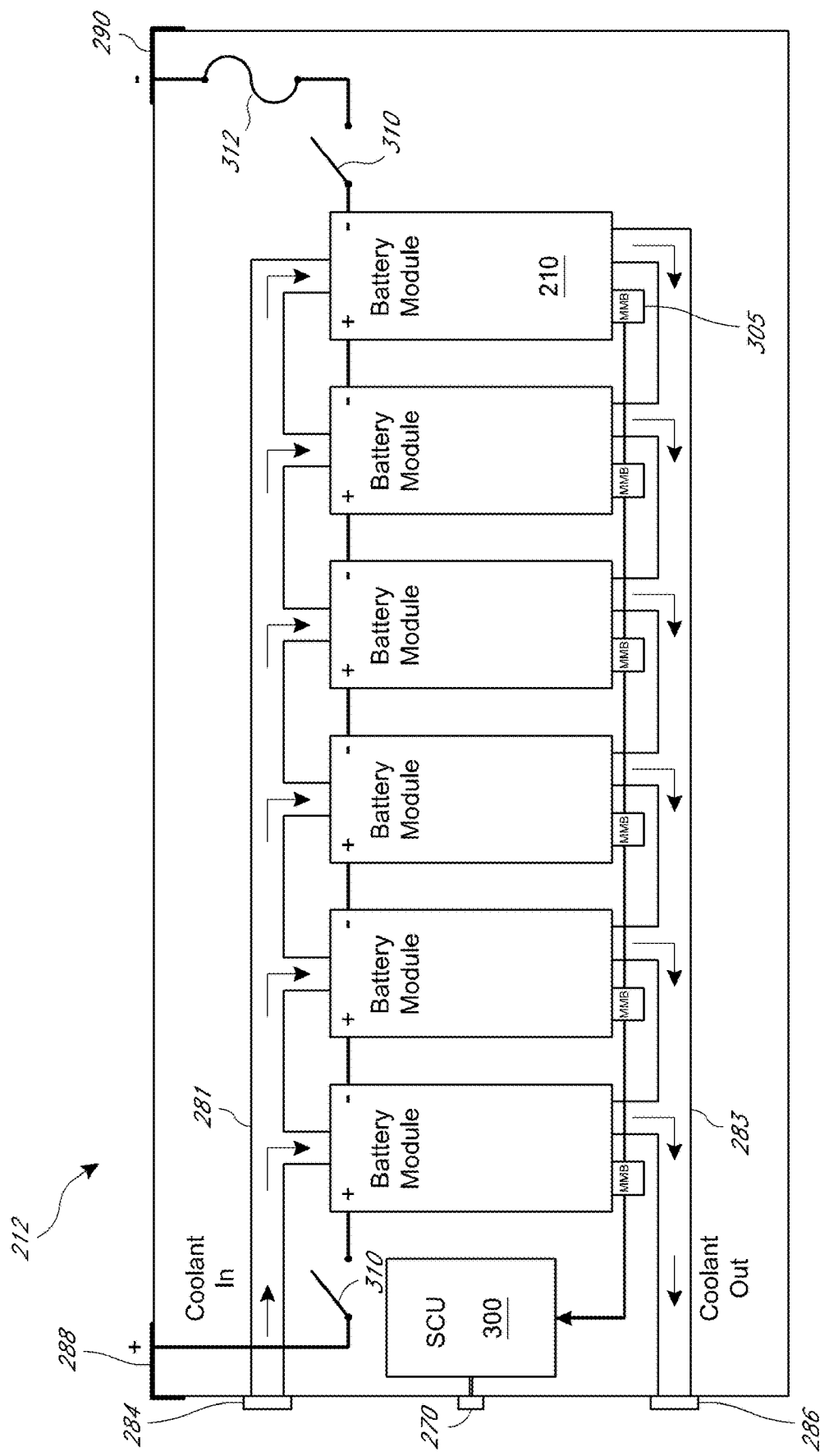
FIG. 20C schematically illustrates various components of a modular battery string in accordance with an exemplary embodiment.

FIG. 20C schematically illustrates various components of a modular battery string 212 in accordance with an exemplary embodiment. A battery string 212 may include one or more battery modules 210 configured to provide high voltage power to a vehicle powertrain. The battery string 212 may further include a coolant circulation system, such as one or more coolant intake conduits 281 and coolant outlet conduits 283, and monitoring and/or control circuitry, such as a string control unit (SCU) 300. The battery string 212 may include external connections as described above, such as a positive high-voltage connector 288 and negative high-voltage connector 290 for the battery modules 210, auxiliary connector 270 for the SCU 300, a coolant inlet 284 for the coolant intake conduit 281, and a coolant outlet 286 for the coolant outlet conduit 283.

Battery modules 210 may be connected in parallel, in series, or in a combination of parallel and series connections within the battery string 212. For example, the six modules 210 depicted in FIG. 20C are connected in series so as to produce a total string voltage of up to six times the voltage of each module 210. The modules 210 may be electrically connected to the positive high-voltage connector 288 and the negative high-voltage connector 290 to deliver electrical power to vehicle systems. The modules 210 may be separable from the vehicle power circuit by one or more circuit interruption elements, such as contactors 310 and/or one or more fusible elements 312. A fusible element 312 may be included as a redundant circuit disconnection device, for example, configured to open the circuit if a contactor 310 fails. In some embodiments, a fusible element 312 may be a passive fuse, thermal cutoff, or the like. The fusible element 312 may also be a selectively blowable fuse configured to blow based on an electrical or thermal input produced in response to a detected contactor failure or other malfunction.

In various embodiments, one or more contactors 310 may be used to control current flow through the battery modules 210. Although one contactor 310 may typically be sufficient to open the circuit through the battery modules 210 and prevent current flow, two contactors 310 may be used for additional control and/or redundancy (e.g., in case of a contactor welding event or other malfunction). Contactors 310 may be located within the battery string 212 and/or outside the battery string 212, such as within the circuitry connecting the battery string 212 to the main high-voltage electrical circuit of the vehicle. Locating the contactors 310 within the battery string 212 may provide enhanced safety. For example, the contactors 310 may be normally open contactors operable only when the string is installed within the vehicle (e.g., powered by the SCU 300, which may be powered when connected to low-voltage vehicle power at the auxiliary connector 270), such that an inadvertent connection between the high-voltage connectors 288 and 290 will not cause current to flow from the battery modules 210 when the battery string 212 is not installed within a vehicle.

The battery modules 210 and other structures within the string 212 may be monitored and/or controlled by one or more module monitoring boards (MMBs) 305 and a string control unit (SCU) 300. In some embodiments, each battery module 210 may have an associated MMB 305. An MMB 305 connected to a battery module 210 may monitor any characteristic or status of the module 210. For example, the MMB 305 may monitor any one or a combination of battery module 210 temperature, coolant temperature, one or more individual battery cell temperatures, current flow into or out of the battery module 210, current flow at a location within the battery module 210, an open circuit voltage of the battery module 210, a voltage between two points within the battery module 210, a charge state of the battery module 210, a detected status such as a fault or alarm generated by a sensor within the battery module 210, or the like.

The MMBs 305 may be connected to the SCU 300 by a wired or wireless connection. In some embodiments, each MMB 305 may be connected directly to the SCU 300, or the MMBs 305 may be connected in a chain, with one or a subset of MMBs 305 connected directly to the SCU 300. The connections between the MMBs 305 and the SCU 300 may allow any of the data collected at the MMBs 305 to be transmitted from the MMB 305 to the SCU 300, such as for analysis, monitoring, or the like. The SCU 300 may include one or more processors, memory units, input/output devices, or other components for storing, analyzing, and/or transmitting data. In some embodiments, a wired connection between the SCU 300 and one or more MMBs 305 may allow the MMBs 305 to draw electrical power for operation from the SCU 300. At the SCU 300, global monitoring and/or control functions may be performed for the battery string 212. For example, the SCU 300 may monitor any characteristic or status of the battery string 212, or of any one or combination of the battery modules 210 within the string 212, such as a temperature, current, voltage, charge state, detected status such as a fault or alarm, or the like. The SCU 300 may control the operation of the battery string 212, such as by causing one or more circuit interruption elements (e.g., contactors 310) to close or open so as to allow current to flow or stop current flow between the battery modules 210 and the high voltage connectors 288 and 290.

The SCU 300 may be connected to an auxiliary connector 270 of the battery string 212 to receive power, receive data, and/or transmit data to other vehicle systems. For example, the auxiliary connector 270 may include a CAN bus connector, other data connector, a power connector, or the like. The SCU 300 may communicate any characteristic or status, or other information determined based on a characteristic or status of at least a portion of the string 212, to other systems of the vehicle through a vehicle wiring connector (not shown) connected to the battery string 212 at the auxiliary connector 270. In some embodiments, the auxiliary connector 270 may be further configured to draw current from a vehicle wiring connector (not shown) and deliver electrical power to the SCU 300, such as for operation of electrical components of the SCU 300 and/or MMBs 305.

The battery string 212 may include one or more internal conduits 281, 283 for liquid coolant. As described above, coolant may enter the battery string 212 from an external conduit (not shown) at an inlet 284 and leave the battery string 212 at an outlet 286. Upon entering the battery string at the inlet 284, coolant may travel through an internal coolant intake conduit 281 to enter one of the battery modules 210. After traveling through a battery module 210, where the coolant may absorb heat from one or more components of the battery module 210 (e.g., electrochemical battery cells, internal electronic components, or the like), the coolant may travel through an internal coolant outlet conduit 283 to the coolant outlet 286, where it may return to the external cooling system. As described above, coolant leaving at the outlet 286 may be propelled by one or more pumps (not shown) to a heat exchanger, reservoir, and/or other components of the cooling system.

The foregoing description details certain embodiments of the systems, devices, and methods disclosed herein. It will be appreciated, however, that no matter how detailed the foregoing appears in text, the devices and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated. The scope of the disclosure should therefore be construed in accordance with the appended claims and any equivalents thereof.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

It is noted that the examples may be described as a process. Although the operations may be described as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc.

It will be appreciated by those skilled in the art that various modifications and changes may be made without departing from the scope of the described technology. Such modifications and changes are intended to fall within the scope of the embodiments, as defined by the appended claims. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged, or excluded from other embodiments.

Those of skill would further appreciate that any of the various illustrative schematic drawings described in connection with the aspects disclosed herein may be implemented as electronic hardware (e.g., a digital implementation, an analog implementation, or a combination of the two, which may be designed using source coding or some other technique), various forms of program or design code incorporating instructions, or combinations of both.

The various circuitry, controllers, microcontroller, or switches, and the like, that are disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both.

The functions described may be implemented in hardware, software, firmware, or any combination thereof. If implemented in software, the functions may be stored on or transmitted over as one or more instructions or code on a tangible, non-transitory computer-readable medium. Computer-readable media includes both computer storage media and communication media including any medium that facilitates transfer of a computer program from one place to another. A storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. A computer-readable medium may be in the form of a non-transitory or transitory computer-readable medium.

The term "determining" encompasses a wide variety of actions and, therefore, "determining" can include calculating, computing, processing, deriving, investigating, looking up (e.g., looking up in a table, a database, or another data structure), ascertaining, and the like. Also, "determining" can include receiving (e.g., receiving information), accessing (e.g., accessing data in a memory), and the like. Determining can also include resolving, selecting, choosing, establishing, and the like.

Though described herein with respect to a vehicle, as would be readily appreciated by one of ordinary skill in the art, various embodiments described herein may be used in additional applications, such as in energy-storage systems for wind and solar power generation. Other embodiments will be apparent to those skilled in the art from consideration of the specification and practice of the disclosed current carrier and battery module. It is intended that the specification and examples be considered as exemplary only, with a true scope being indicated by the following claims and their equivalents.

What is claimed is:

1. An electric vehicle battery pack comprising:
   a rack configured to couple a plurality of independently removable battery strings to the vehicle, the battery strings selectively coupled in parallel to a vehicle power bus, individual battery strings of the plurality of battery strings comprising:
   an individual battery string housing;
   a plurality of electrochemical cells disposed within the housing;
   a circuit for electrically connecting the plurality of electrochemical cells, the circuit having a positive terminal and a negative terminal;
   a positive high-voltage connector located on an exterior surface of the housing, the positive high-voltage connector electrically coupled to the positive terminal;
   a negative high-voltage connector located on an exterior surface of the housing, the negative high-voltage connector electrically coupled to the negative terminal;
   a switch disposed within the housing and electrically connected in series with at least the positive high-voltage connector; and
   a string control unit disposed within the housing, the string control unit electrically coupled to and configured to control the switch; and
   a battery pack controller in communication with the string control units and one or more other components of the vehicle;

wherein each battery string comprises a plurality of battery modules connected in series, each battery module comprising a plurality of electrochemical cells;

wherein each battery string further comprises a plurality of module monitoring boards, each module monitoring board communicatively coupled to the string control unit and to one of the plurality of battery modules and configured to monitor at least one of a current, a voltage, and a temperature associated with the one battery module; and wherein the battery pack controller comprises one or more processors and memory storing instructions that, when executed by the one or more processors, cause the one or more processors to:

receive, from a string control unit of an individual battery string or from the one or more other components of the vehicle, a signal indicating a fault condition;

determine, based on the signal, whether the fault condition is a first type of fault condition for which the individual battery string should be disconnected or a second type of fault condition for which all of the battery strings should be disconnected;

cause actuation of the switch of the individual battery string to disconnect the individual battery string from the vehicle power bus while at least one other individual battery string continues providing power to the vehicle power bus when the fault condition is the first type of fault condition; and cause actuation of the switches of all of the battery strings to disconnect all of the battery strings from the vehicle power bus when the fault condition is the second type of fault condition.

2. The electric vehicle battery pack of claim 1, wherein each battery string further comprises:

a coolant inlet located on an exterior surface of the housing and configured to couple with and sealingly uncouple from an external coolant supply conduit;

a coolant outlet located on an exterior surface of the housing and configured to couple with and sealingly uncouple from an external coolant return conduit; and an auxiliary connector located on an exterior surface of the housing and configured to couple with at least one of an external communications system and an external low-voltage power supply.

3. The electric vehicle battery pack of claim 2, wherein the auxiliary connector comprises a CAN bus connector configured to couple with a CAN bus.

4. The electric vehicle battery pack of claim 2, further comprising one or more thermal barriers configured to at least partially insulate adjacent battery strings.

5. The electric vehicle battery pack of claim 1, wherein the switch comprises a magnetic contactor configured to be in a disconnected position when the magnetic contactor is not energized.

6. An electric vehicle battery pack comprising:

a rack configured to couple a plurality of independently removable battery strings to the vehicle, the battery strings selectively coupled in parallel to a vehicle power bus, individual battery strings of the plurality of battery strings comprising:

an individual battery string housing;

a plurality of electrochemical cells disposed within the housing;

a circuit for electrically connecting the plurality of electrochemical cells, the circuit having a positive terminal and a negative terminal;

a positive high-voltage connector located on an exterior surface of the housing, the positive high-voltage connector electrically coupled to the positive terminal;

a negative high-voltage connector located on an exterior surface of the housing, the negative high-voltage connector electrically coupled to the negative terminal;

a coolant inlet located on an exterior surface of the housing and configured to couple with and sealingly uncouple from an external coolant supply conduit;

a coolant outlet located on an exterior surface of the housing and configured to couple with and sealingly uncouple from an external coolant return conduit;

a string control unit configured to selectively cause disconnection of the battery string from the vehicle power bus; and an auxiliary connector located on an exterior surface of the housing and configured to couple with at least one of an external communications system and an external low-voltage power supply; and a battery pack controller in communication with the string control units and one or more other components of the vehicle;

wherein each battery string comprises a plurality of battery modules connected in series, each battery module comprising a plurality of electrochemical cells;

wherein each battery string further comprises a plurality of module monitoring boards, each module monitoring board communicatively coupled to the string control unit and to one of the plurality of battery modules and configured to monitor at least one of a current, a voltage, and a temperature associated with the one battery module; and wherein the battery pack controller comprises one or more processors and memory storing instructions that, when executed by the one or more processors, cause the one or more processors to:

receive, from a string control unit of an individual battery string or from the one or more other components of the vehicle, a signal indicating a fault condition;

determine, based on the signal, whether the fault condition is a first type of fault condition for which the individual battery string should be disconnected or a second type of fault condition for which all of the battery strings should be disconnected;

cause disconnection of the individual battery string from the vehicle power bus while at least one other individual battery string continues providing power to the vehicle power bus when the fault condition is the first type of fault condition; and cause disconnection of all of the battery strings from the vehicle power bus when the fault condition is the second type of fault condition.

7. The electric vehicle battery pack of claim 6, wherein each battery string further comprises a switch disposed within the housing and electrically connected in series with at least the positive terminal.

8. The electric vehicle battery pack of claim 7, wherein the string control unit of each battery string is disposed within the housing, the string control unit electrically coupled to and configured to control the switch.

9. The electric vehicle battery pack of claim 8, wherein the auxiliary connector is configured to couple with the external low-voltage power supply, and wherein the string control unit is configured to draw electrical power from the auxiliary connector.

10. The electric vehicle battery pack of claim 6, wherein the auxiliary connector comprises a CAN bus connector configured to connect to a CAN bus.

11. The electric vehicle battery pack of claim 6, further comprising one or more thermal barriers configured to at least partially insulate adjacent battery strings.

* * * * *

UNITED STATES PATENT AND TRADEMARK OFFICE
CERTIFICATE OF CORRECTION

PATENT NO. : 11,258,104 B2
APPLICATION NO. : 15/192947
DATED : February 22, 2022
INVENTOR(S) : Chidester et al.

Page 1 of 1

It is certified that error appears in the above-identified patent and that said Letters Patent is hereby corrected as shown below:

On the Title Page

Item (71) (Applicant), Line 1, delete "Faraday & Future Inc.," and insert --Faraday&Future Inc.,--.

Item (73) (Assignee), Line 1, delete "Faraday & Future Inc.," and insert --Faraday&Future Inc.,--.

In the Specification

Column 6, Line 56, delete "2b," and insert --24b,--.

Signed and Sealed this
Tenth Day of May, 2022

Katherine Kelly Vidal

Katherine Kelly Vidal
*Director of the United States Patent and Trademark Office*